(12) United States Patent
New

(10) Patent No.: US 9,720,903 B2
(45) Date of Patent: Aug. 1, 2017

(54) METHOD FOR PARSING NATURAL LANGUAGE TEXT WITH SIMPLE LINKS

(71) Applicant: Robert D. New, Redmond, WA (US)

(72) Inventor: Robert D. New, Redmond, WA (US)

(*) Notice: Subject to any disclaimer, the term of this patent is extended or adjusted under 35 U.S.C. 154(b) by 447 days.

(21) Appl. No.: 13/947,878

(22) Filed: Jul. 22, 2013

(65) Prior Publication Data

US 2014/0019122 A1    Jan. 16, 2014

Related U.S. Application Data

(63) Continuation-in-part of application No. 13/545,709, filed on Jul. 10, 2012, now abandoned.

(51) Int. Cl.
    *G06F 17/27* (2006.01)
(52) U.S. Cl.
    CPC ........ *G06F 17/2765* (2013.01); *G06F 17/271* (2013.01)
(58) Field of Classification Search
    CPC .... G06F 17/27; G06F 17/2705; G06F 17/271; G06F 17/2715; G06F 17/2765; G10L 15/18; G10L 15/1822
    USPC .......................................... 704/1, 9, 10, 257
    See application file for complete search history.

(56) References Cited

U.S. PATENT DOCUMENTS

| | | | |
|---|---|---|---|
| 4,887,212 A | 12/1989 | Zamora et al. | |
| 4,994,966 A | 2/1991 | Hutchins | |
| 5,060,155 A * | 10/1991 | van Zuijlen | G06F 17/2705 704/9 |
| 5,095,432 A * | 3/1992 | Reed | G06F 17/271 704/9 |
| 5,475,588 A | 12/1995 | Schabes et al. | |
| 5,926,784 A | 7/1999 | Richardson et al. | |
| 5,930,746 A * | 7/1999 | Ting | G06F 17/271 704/2 |
| 6,108,620 A | 8/2000 | Richardson et al. | |
| 6,236,959 B1 | 5/2001 | Weise | |
| 6,332,118 B1 | 12/2001 | Yamabana | |
| 6,609,087 B1 * | 8/2003 | Miller | G06F 17/271 704/9 |
| 6,714,941 B1 * | 3/2004 | Lerman | G06F 17/30864 704/254 |
| 6,785,643 B2 | 8/2004 | Hayosh et al. | |
| 6,983,239 B1 | 1/2006 | Epstein | |
| 6,999,917 B1 | 2/2006 | Moore | |

(Continued)

OTHER PUBLICATIONS

Michael A. Covington, "A Fundamental Algorithm for Dependency Parsing", Proceedings of the 39th Annual ACM Southeast Conference (2001), ed. John A Miller and Jeffrey W. Smith, pp. 95 to 102.*

(Continued)

*Primary Examiner* — Martin Lerner
(74) *Attorney, Agent, or Firm* — Chernoff Vilhauer LLP

(57) ABSTRACT

A parser for natural language text is provided. The parser is trained by accessing a corpus of labeled utterances. The parser extracts details of the syntactic tree structures and part of speech tags from the labeled utterances. The details extracted from the tree structures include Simple Links which are the key to the improved efficiency of this new approach. The parser creates a language model using the details that were extracted from the corpus. The parser then uses the language model to parse utterances.

10 Claims, 21 Drawing Sheets

(56) References Cited

U.S. PATENT DOCUMENTS

Figure 1:
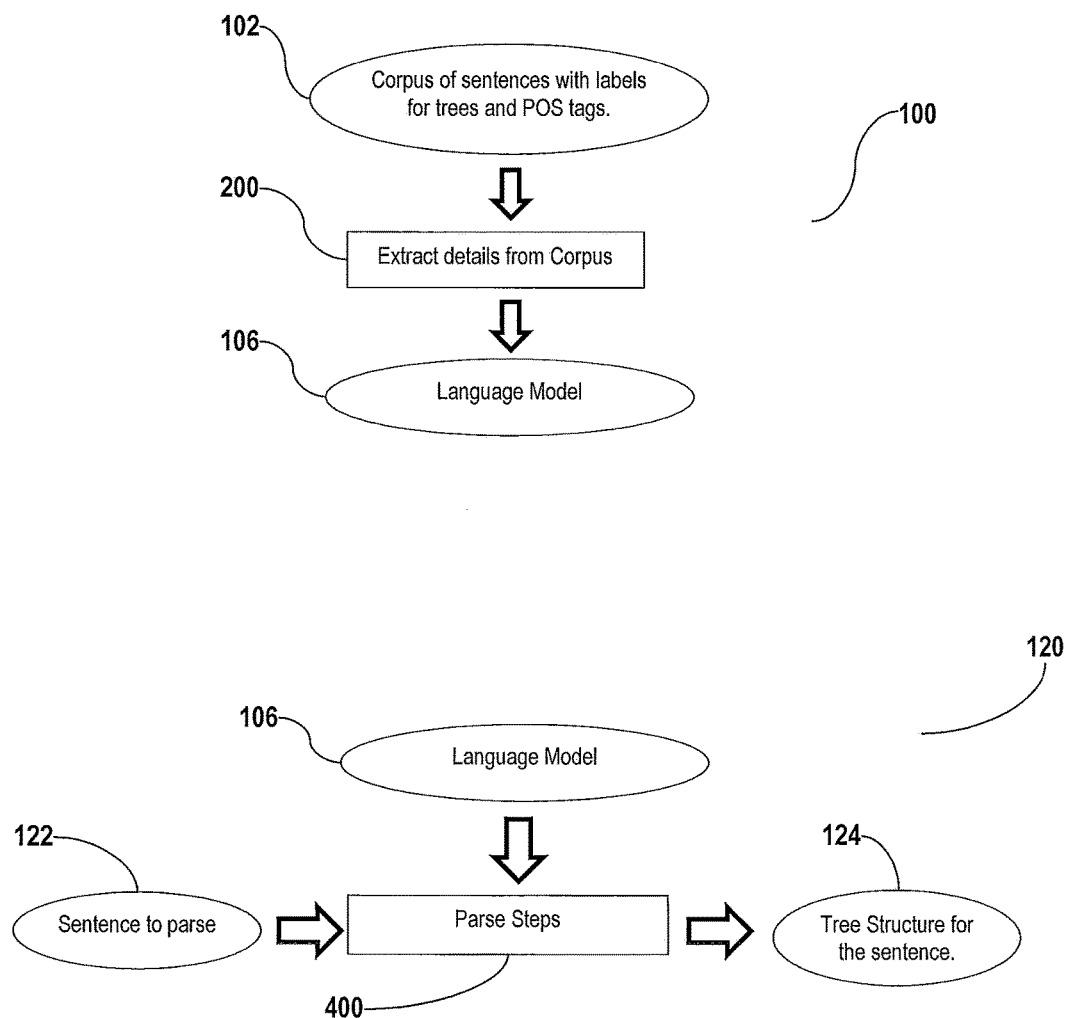

| | | | | |
|---|---|---|---|---|
| 7,003,444 | B2* | 2/2006 | Weise | G06F 17/274 704/9 |
| 7,024,351 | B2 | 4/2006 | Wang | |
| 7,047,183 | B2 | 5/2006 | Wang | |
| 7,058,567 | B2 | 6/2006 | Ait-Mokhtar et al. | |
| 7,139,697 | B2* | 11/2006 | Hakkinen | G06F 17/2715 704/8 |
| 7,146,308 | B2* | 12/2006 | Lin | G06F 17/271 704/9 |
| 7,505,896 | B2 | 3/2009 | Parkinson | |
| 7,962,323 | B2 | 6/2011 | Johnson et al. | |
| 7,962,904 | B2 | 6/2011 | Zabokritski | |
| 7,970,600 | B2 | 6/2011 | Chen et al. | |
| 2004/0133579 | A1* | 7/2004 | Campbell | G06F 17/2872 |
| 2004/0172237 | A1* | 9/2004 | Saldanha | G06F 17/2229 704/4 |
| 2006/0184353 | A1* | 8/2006 | Weise | G06F 17/2715 704/4 |
| 2006/0277028 | A1* | 12/2006 | Chen | G06F 17/2715 704/4 |
| 2007/0179776 | A1* | 8/2007 | Segond | G06F 17/2247 704/9 |
| 2008/0126080 | A1* | 5/2008 | Saldanha | G06F 17/2229 704/9 |
| 2008/0221870 | A1* | 9/2008 | Attardi | G06F 17/2264 704/9 |
| 2008/0221874 | A1* | 9/2008 | Cao | G06F 17/2755 704/9 |
| 2008/0319735 | A1* | 12/2008 | Kambhatla | G06F 17/277 704/9 |
| 2010/0318348 | A1* | 12/2010 | Chelba | G06F 17/271 704/9 |
| 2011/0040553 | A1 | 2/2011 | Sasivarman | |
| 2011/0119049 | A1 | 5/2011 | Ylonen | |
| 2011/0257962 | A1* | 10/2011 | Gopi | G06F 17/2881 704/9 |
| 2011/0301942 | A1* | 12/2011 | Collobert | G06F 17/2775 704/9 |

OTHER PUBLICATIONS

Norshuhani Zamin, "Information Extraction using Link Grammar", 2009 World Congree on Computer Science and Information Engineering, pp. 149 to 153.*

Wikipedia, "Parse Tree", 6 Pages, downloaded Apr. 14, 2016.*

Kasami, T. 1965. An efficient recognition and syntax analysis algorithm for context-free languages. Technical Report AF-CRL-65-758, Air Force Cambridge Research Laboratory, Bedford, Massachusetts (Abstract Only).

Abney, S. "Parsing by Chunks" Principle-Based Parsing, R. Berwick, S. Abney, C. Tenny (eds.). Kluwer Academic Publishers., Nov. 10, 1994, pp. 1-18.

Marcus, M., et al., "Building a Large Annotated Corpus of English: The Penn Treebank." Computational Linguistics, 1993, 19(2): 313-330.

Ratnaparkhi, A. "A Linear Observed Time Statistical Parser Based on Maximum Entropy Models," Proceedings of the Second Conference on Emirical Methods in Natural Language Processing, 1997, Providence, Rhode Island, pp. 1-10.

Collins, M., et al. "Incremental Parsing with the Perceptron Algorithm," 42nd Annual Meeting of the Association of Computational Linguistics, Barcelona, 2004, pp. 1-8.

Nivre, J. "Incrementality in Deterministic Dependency Parsing," In Proceedings of the Workshop on Incremental Parsing (ACL), 2004, pp. 50-57.

Nivre, J., et al., "Deterministic Dependency Parsing of English Text," Proceedings of Coling 2004. Geneva Switzerland, 2004, pp. 1-7.

Tsuruoka, Y., et al., "Chunk Parsing Revisited," Proceedings of the Ninth International Workshop on Parsing Technologies. Vancouver, British Columbia, 2005, pp. 133-140.

Seginer, Y., "Fast Unsupervised Incremental Parsing." Proceedings of the 45th Annual Meeting of the Association of Computational Linguistics. Prague, Czech Republic, Jun. 2007, pp. 384-391.

Nivre, J., "Dependency Grammar and Dependency Parsing," Växjö University, 2005, pp. 1-32.

* cited by examiner

METHOD FOR PARSING NATURAL LANGUAGE TEXT WITH SIMPLE LINKS

CROSS-REFERENCE TO RELATED APPLICATIONS

This application is a continuation in part of Ser. No. 13/545,709, now abandoned.

BACKGROUND OF THE INVENTION

In natural language understanding, computerized language systems attempt to identify a logical representation for a text string. In some systems, the representation is a syntactic or grammar-based representation and is formed by performing a syntactic parse of the text.

In many systems, the logical representation takes the form of a sentence tree structure that has the words of the text as leaves and nodes arranged as branches in the tree. An example sentence tree structure is given in FIG. 6i.

Many different types of parsers have been created. The goal of all parsers is to access a new or unseen utterance and create the logical representation of the utterance.

CFG Parsers

In one type of parser, hand written rules are created that describe how words can be joined together to form phrases and sub-phrases. Additional rules describe how phrases can be joined into larger phrases and sentences. An utterance is parsed by finding one or more words that match one of the rules and linking them together. This process is repeated until all words have been matched to rules. The words are thus grouped together into sub-phrases. The sub-phrases are then grouped together into phrases. Each time a rule is applied to group words and/or phrases, a new node is created that contains the elements that are grouped. Ultimately all words and phrases are grouped into a single node that represents the entire utterance. The term Context Free Grammar (CFG) has been used to describe such a system of rules for parsing.

Dependency Link Parsers

Another type of parser involves hand written rules that describe what words can be linked to other words. These links are formed between words which are dependent on each other in some form. For example in the phrase "the dog", the word 'the' is said to be dependent on 'dog'. This dependent relationship indicates that 'the' in some way modifies 'dog'. Further examples are the phrases "that dog", or "Jim's dog". In these phrases, 'that' and 'Jim's' are dependent on 'dog' and each modify 'dog' in some way.

These dependent links can be found between all words of an utterance. All words of an utterance are contained in one or more of these dependent relationships. In each of these dependency links, one word is dependent on the other. The dependent word can come before or after the word it depends on. When an utterance is parsed with this type of parse, a single word is said to be the head of the utterance. All other words in the utterance directly depend on the head word or indirectly depend on the head word by depending on one or more intermediary words that depend on the head word. The term Dependency Grammar has been used to describe such a system for parsing utterances.

CKY Parsers

Another type of parser involves automatically detecting the rules for parsing the utterance. In such a system, there is a training phase and a decoding phase. In the training phase, the rules for parsing an utterance are detected by examining a set of training utterances. The training utterances come from a corpus. Each utterance in the corpus has been labeled to indicate the ideal parse for the utterance. The labels on each utterance indicate which words are grouped into phrases and how the phrases are grouped into the full utterance. These labels in the corpus define the tree structure of each utterance in the corpus. In addition, the labels give a part of speech tag (POS) for each word. For example a word may be a verb, a noun, an adjective or a plurality of other values defined by the conventions of the corpus.

During the training phase, the system collects the labels that indicate how words are grouped into phrases. These labels are converted to a form that is similar to the rules of the hand written rules for the CFG parser. For example a rule found might be that an utterance consists of a noun phrase followed by a verb phrase. Another rule found might be that a noun phrase consists of a determiner followed by a noun as in "the dog".

Also, the POS tags for each word are collected. A given word may have more than one POS tag. For example the word 'top', can be a noun, a verb or an adjective. The training phase collects this information from the corpus and stores it in a data structure that is sometimes called a language model.

When the training phase is completed, the language model is then used during the decoding phase. The decoding phase uses the language model to parse utterances. The parsing process is similar to the process used when applying hand written rules for a CFG. This method of extracting a language model from a corpus and then applying the model to parse utterances is often referred to as supervised parsing. A common type of supervised parsing is a CKY parser.

Common Cover Links

Figure 16:
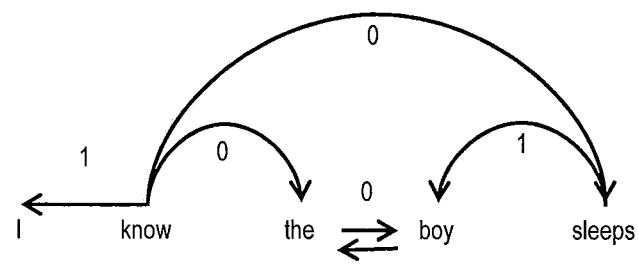

Common Cover Links (CCL) is a type of parser that parses an utterance by creating links between words. FIG. 16 shows an example of an utterance that has been parsed using common cover links. Common cover links are characterized by these attributes:

Each link has a head and a base which are individual words in the utterance.

Each link has a depth value of either 0 or 1.

Each link has can go forward or backward in the utterance.

When a CCL parser is parsing an utterance, it creates links from the current word to words that preceded it in the utterance. Each word may be assigned multiple links.

Ambiguity from Parsing

In all methods of parsing, there is ambiguity. Ambiguity means there are different choices for how an utterance is parsed. One source of ambiguity is in the individual words since a word may have more than one POS tag. When the parser encounters a word that can be either a verb or a noun, the parser must choose which tag is appropriate. The choice then affects which rules can be applied to the word. If the parser chooses verb, then there is a group of rules that apply to verbs. Similarly, there is a group of rules that apply to nouns.

Figure 8A:
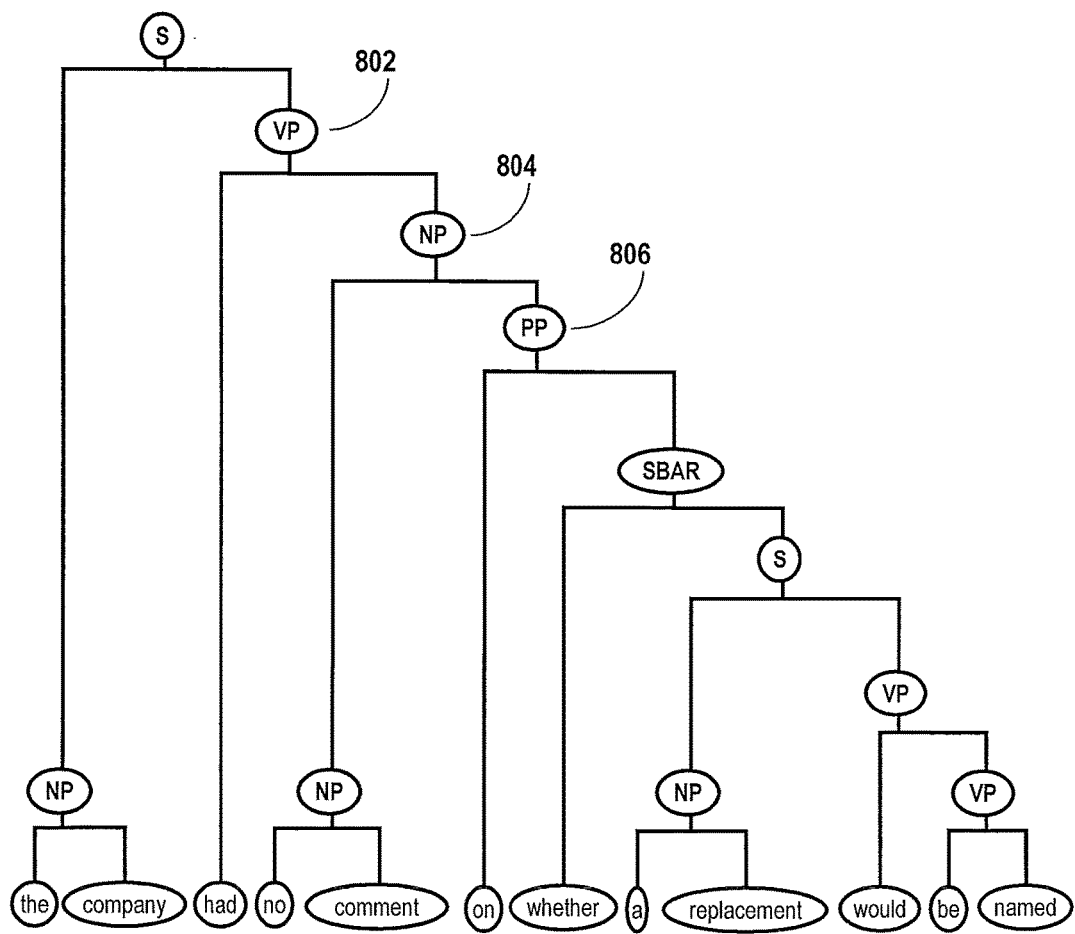
Figure 8B:
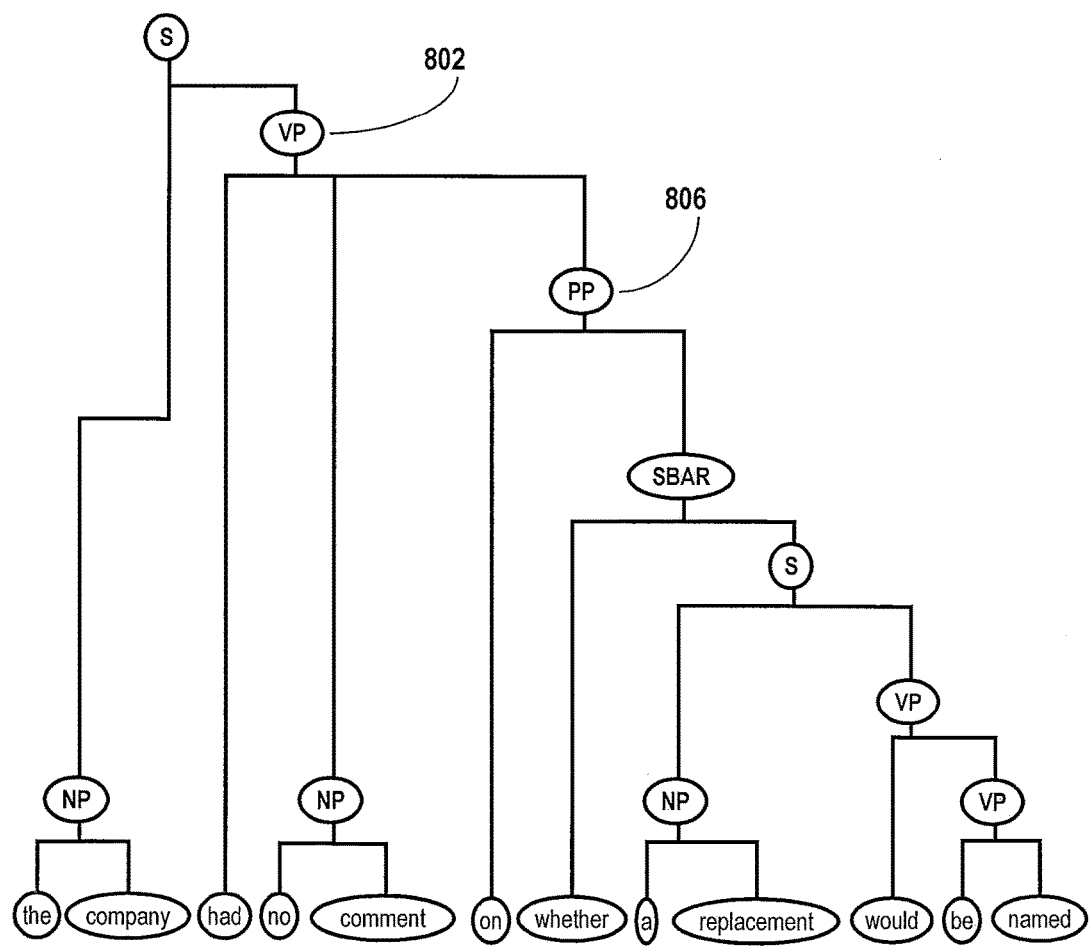

Another source of ambiguity involves how to group phrases into larger phrases. For example, FIG. 8a and FIG. 8b, show alternate ways to attach a prepositional phrase (PP) within the utterance. In FIG. 8a, the PP node 806 is a child of the NP node 804. The PP 'on whether a . . . ' is modifying the noun phrase 'no comment'. In FIG. 8b, the PP node 806 is a child of the VP node 802. The PP 'on whether a . . . ' is modifying the verb 'had'.

All of this ambiguity leads to many different ways that an utterance can be parsed. The parser must choose one parse that is most likely to be the correct parse. One common method of choosing the best parse is to assign a probability value to each possible parse. The best parse is the one that has the highest probability. The probability for a given parse is calculated from the probabilities of each phrase in the parse. Each phrase of the parse gets its probabilities from the words or sub-phrases that linked into it. So each parse for an utterance has a probability that is calculated from each of the words and phrases.

In order for the parser to find the best parse using probabilities, it must find all of the possible parses and calculate the probabilities for each of those parses. An utterance that has N words will have $N^3$ possible parses. So an utterance with 10 words will have $10^3$ or 1000 possible parses.

Terms for the Field

Common Ancestor—In a tree structure, any two nodes will have a common ancestor which is the closest node found going up the tree that is an ancestor to both nodes. For example, in FIG. 6i, the word 'those' 616 and the word 'estimates' 618 have the NP node 640 as their common ancestor. Similarly, the word 'lane' 610 and the word 'vehemently' 612 have the node 634 as their common ancestor.

Corpus—A list of utterances that are used for developing and testing a parser. Each utterance has labels that were added by a linguist. The labels give details of the utterance tree structures and also the part of speech tags (POS) for each word in the utterances. A commonly used corpus is the Penn Treebank. This corpus has about 40,000 utterances taken from the Wall Street Journal.

Environment—In linguistics, the environment of a word consists of the words that surround the word in question.

F-Measure—A numeric value that represents the accuracy of a parser. The value of F-Measure ranges from 0 to 100 where 100 represents the best possible result. A parser is evaluated by parsing a block of utterances from the corpus. The results of parsing the utterances are compared with the hand labeled version of the same block of utterances. The F-Measure is computed from this comparison.

Language Model—A data structure used by a parser to store data that was collected from the training corpus during the training phase. The contents of the language model are different for different types of parsers.

Left-most descendent—In a tree structure, a left most descendent for a node is the word that is a descendent of the node and is the furthest left in the utterance. For example, in FIG. 6i, the VP node 636 has a left most descendent of 'vehemently' 612. Similarly, the NP node 632, has a left most node of 'the' 602.

Parent Node, Child Node—In a tree structure, two nodes are said to be in a parent/child relationship if the child is attached below the parent. For example, in FIG. 8a, the PP node 806 is a child of the NP node 804. The NP node 804 is a parent of the PP node 806.

Utterance—A list of tokens. A token may be one of these, but is not limited to, a word, punctuation or other symbol. An utterance may be one of these, but is not limited to a sentence, question, or sentence fragment.

ABBREVIATIONS

ADJP—Adjective phrase
NP—Noun phrase
PP—Prepositional phrase
QP—Quantifier phrase
S—Sentence or clause
SBar—Sentence or clause introduced by a subordinating conjunction.
VP—Verb Phrase

SUMMARY OF THE INVENTION

The present disclosure relates to natural language understanding. In particular, the disclosure relates to syntactic parsing of natural language text strings.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 1—Flow diagram of the training and decoding process.

Figure 2:
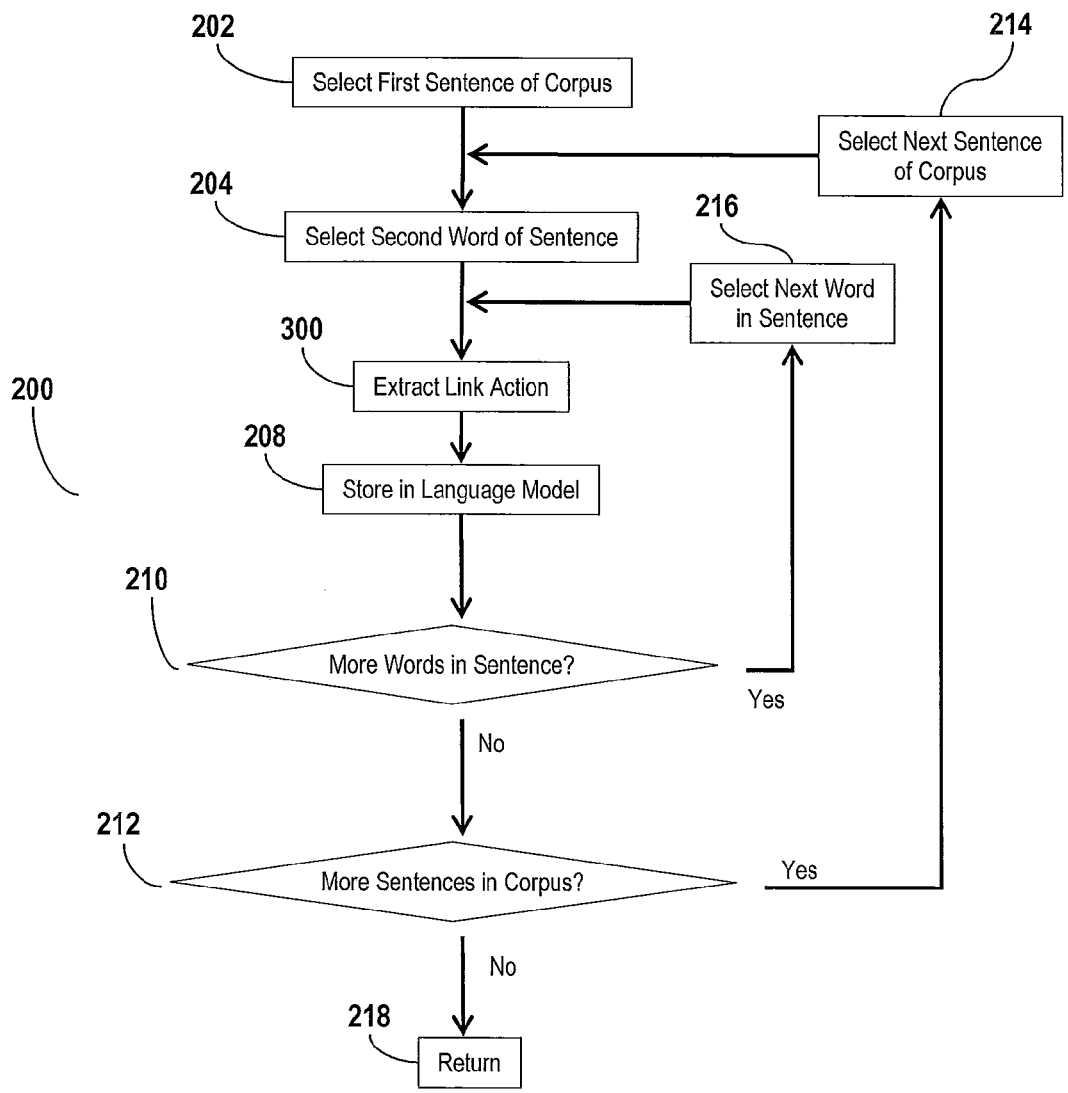

FIG. 2—Flow diagram for extracting details from a training corpus.

Figure 3:
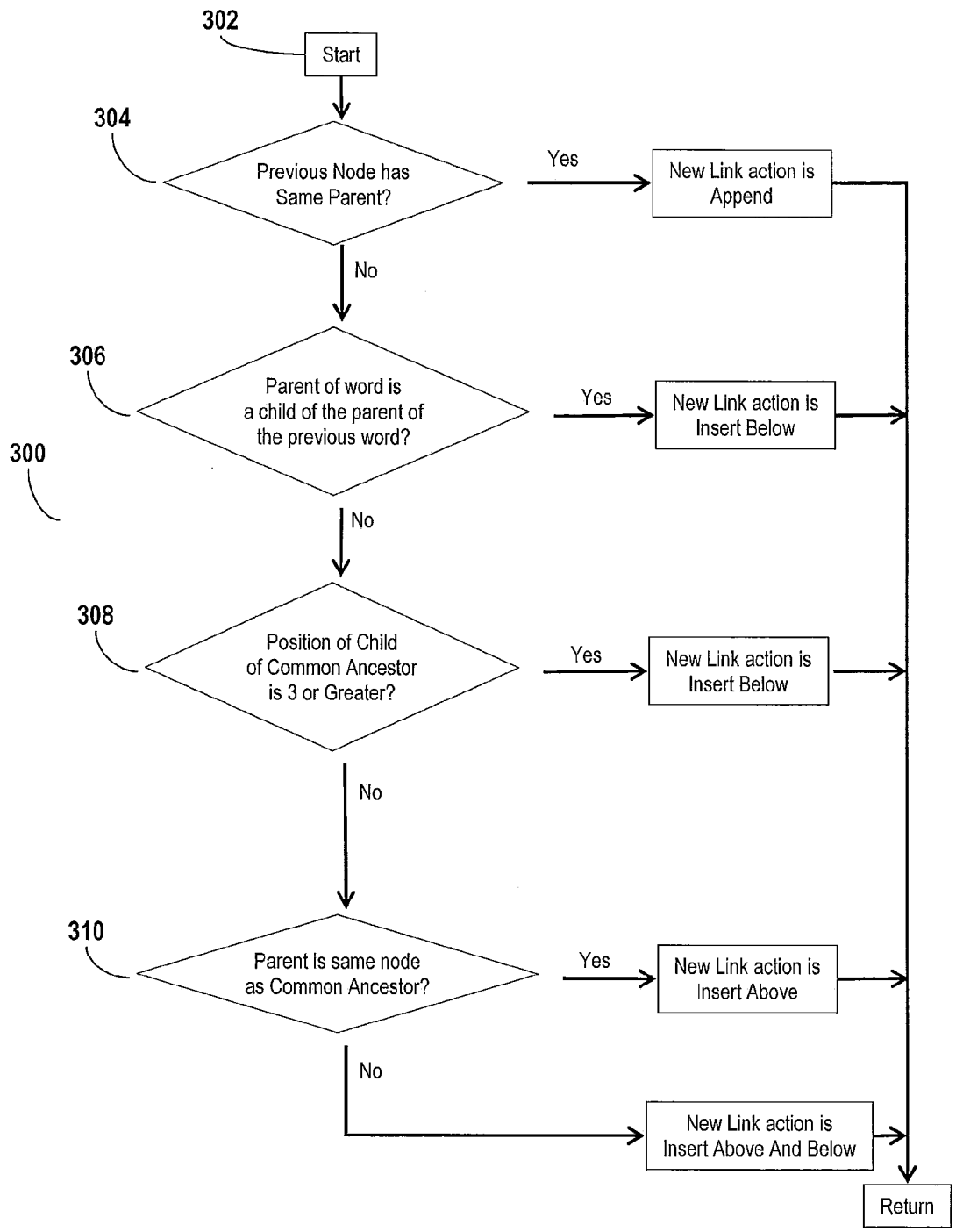

FIG. 3—Flow diagram for extracting a link action for a particular word in a sentence tree structure.

Figure 4:
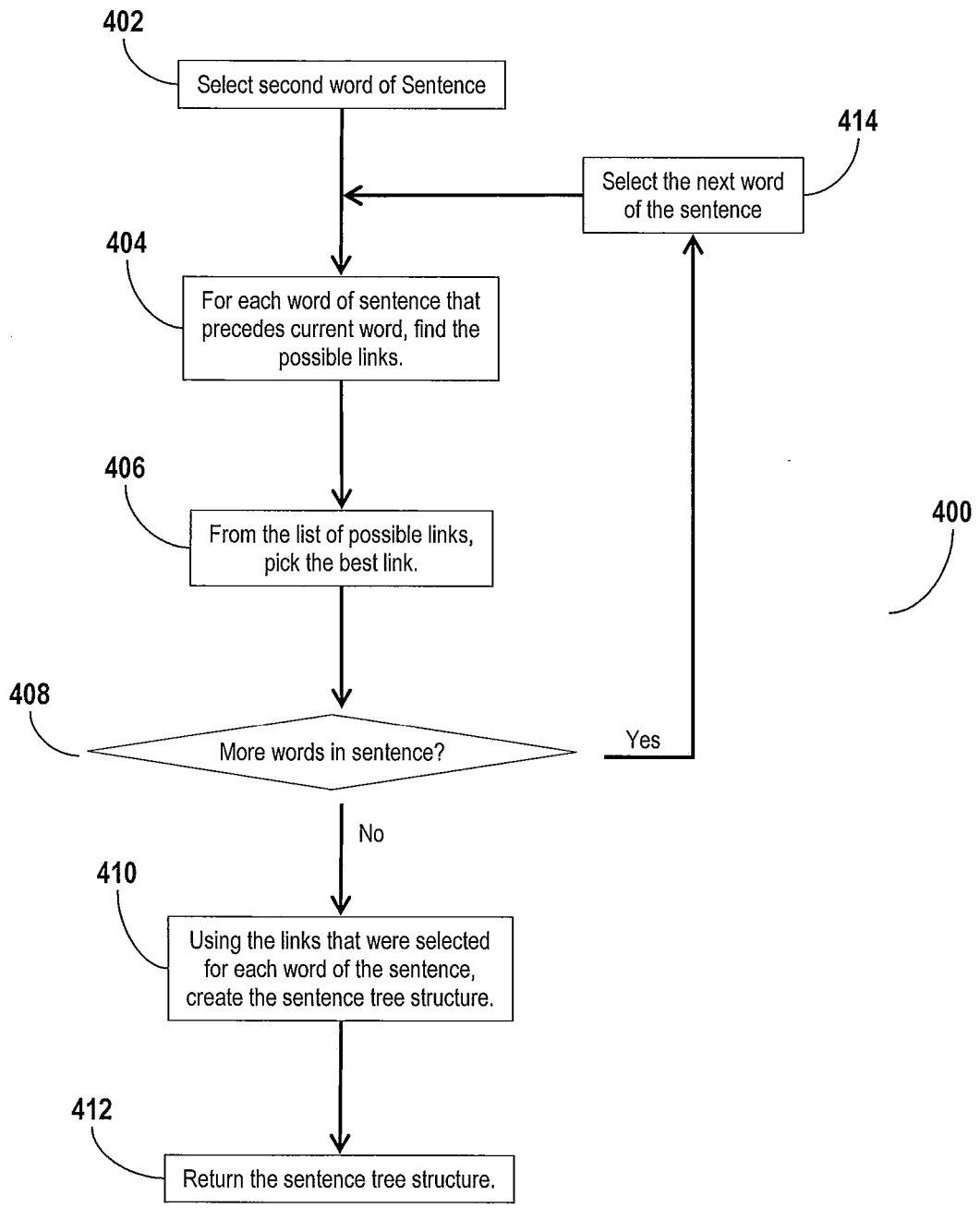

FIG. 4—Flow diagram for parsing an utterance.

Figure 5:
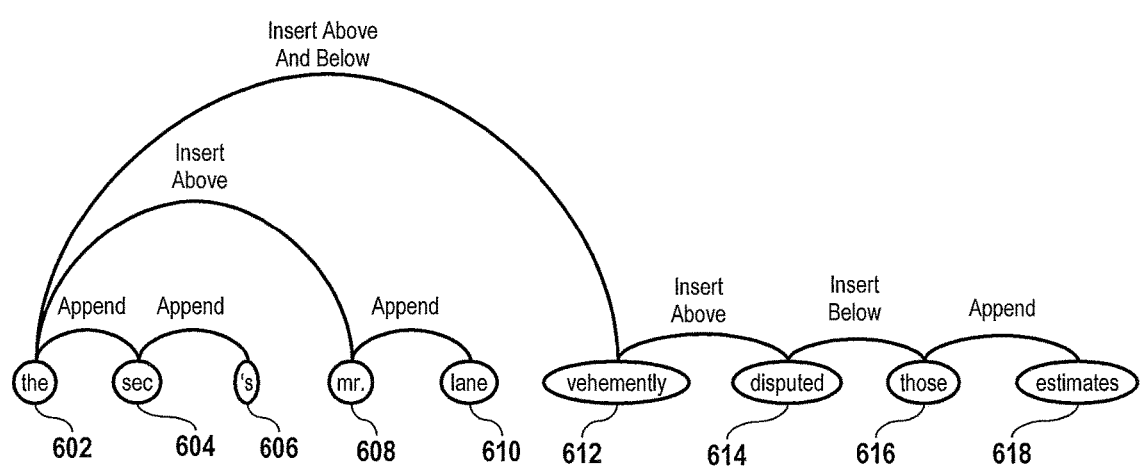

FIG. 5—Example sentence with link actions. Compare to FIG. 6.

FIGS. 6a to 6i—Sentence tree structures that expand as each word of a sentence is added to the tree structure using link actions.

Figure 7:
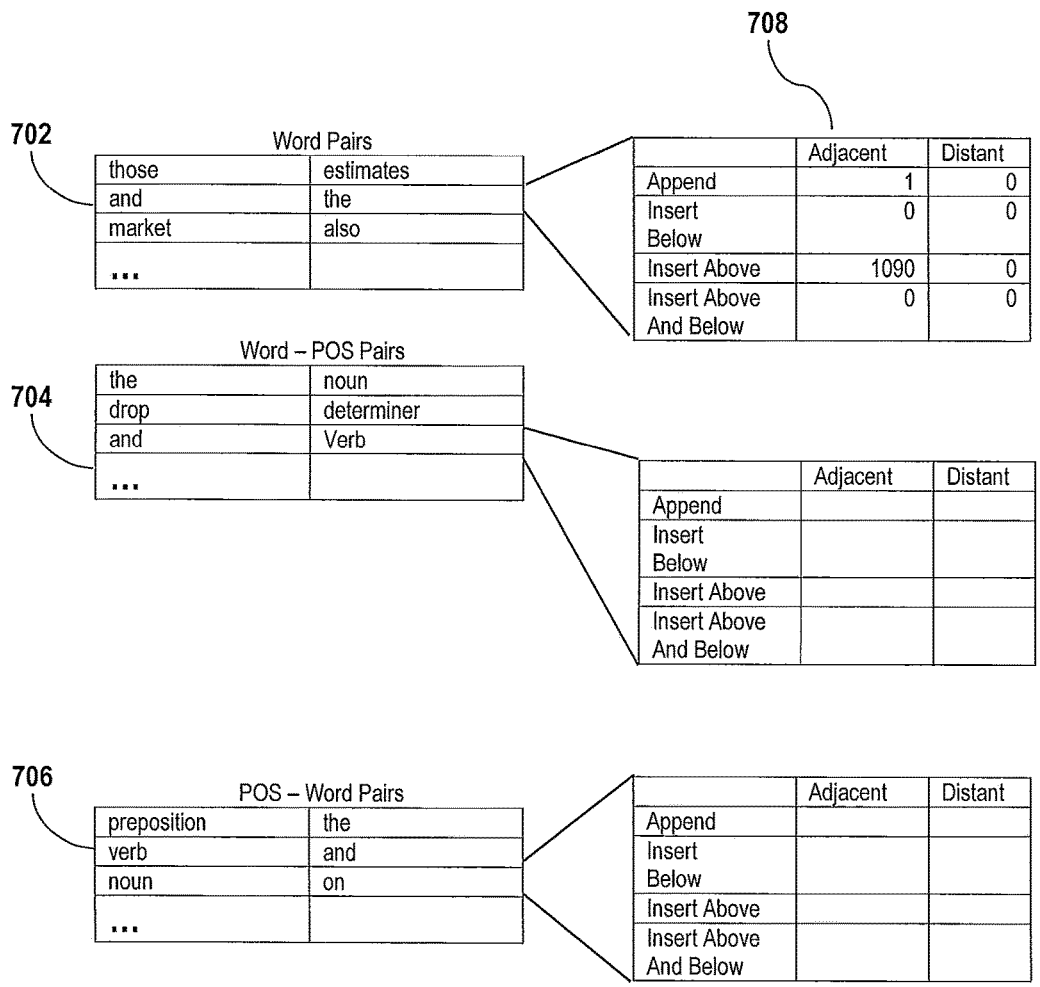

FIG. 7—Example of a language model for a parser.

FIGS. 8a and 8b. Examples of ambiguity in a sentence where a prepositional phrase may be attached to different places in the tree.

Figure 9:
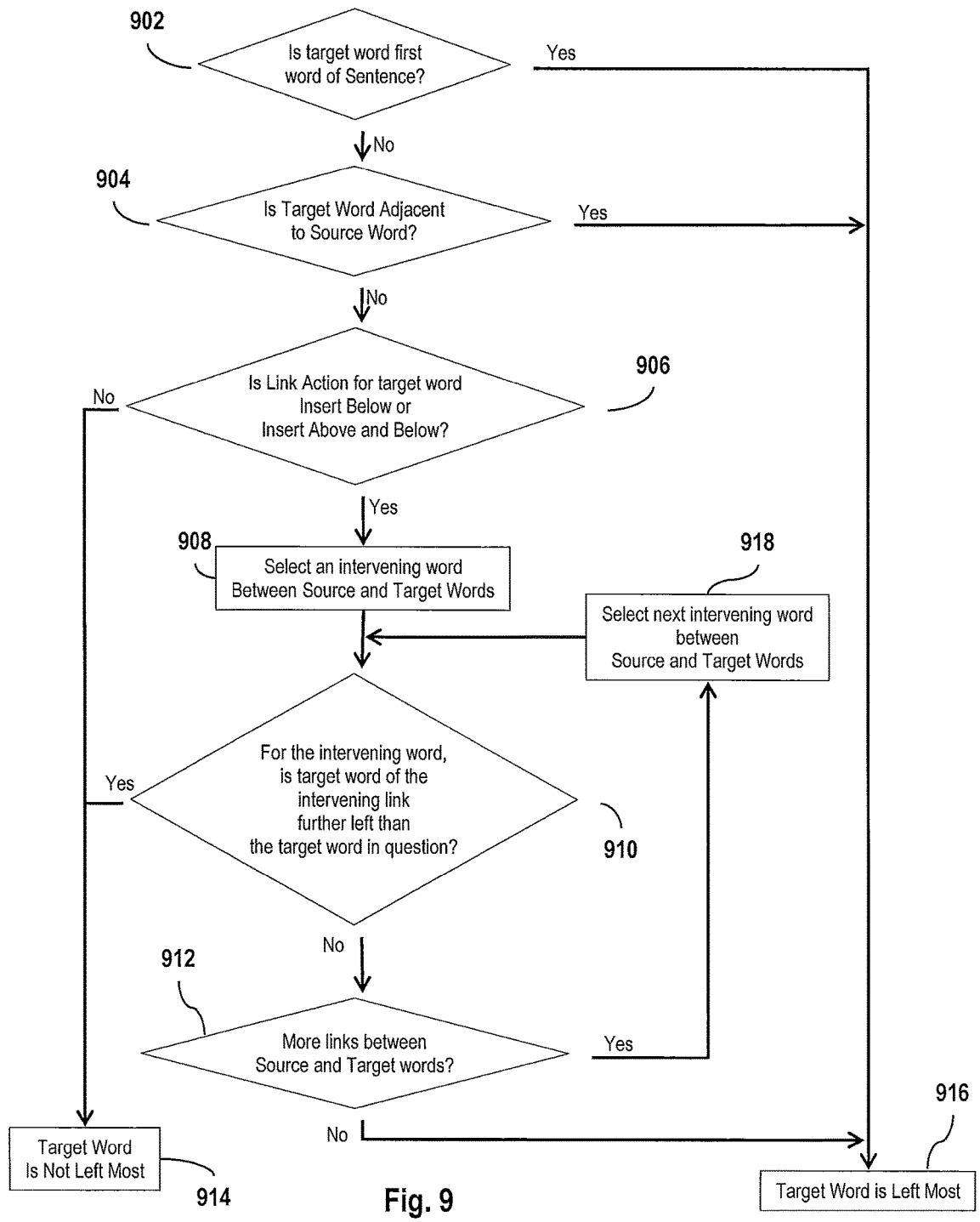

FIG. 9—Flow diagram for using link actions to determine if a node is a left most node.

Figure 10:
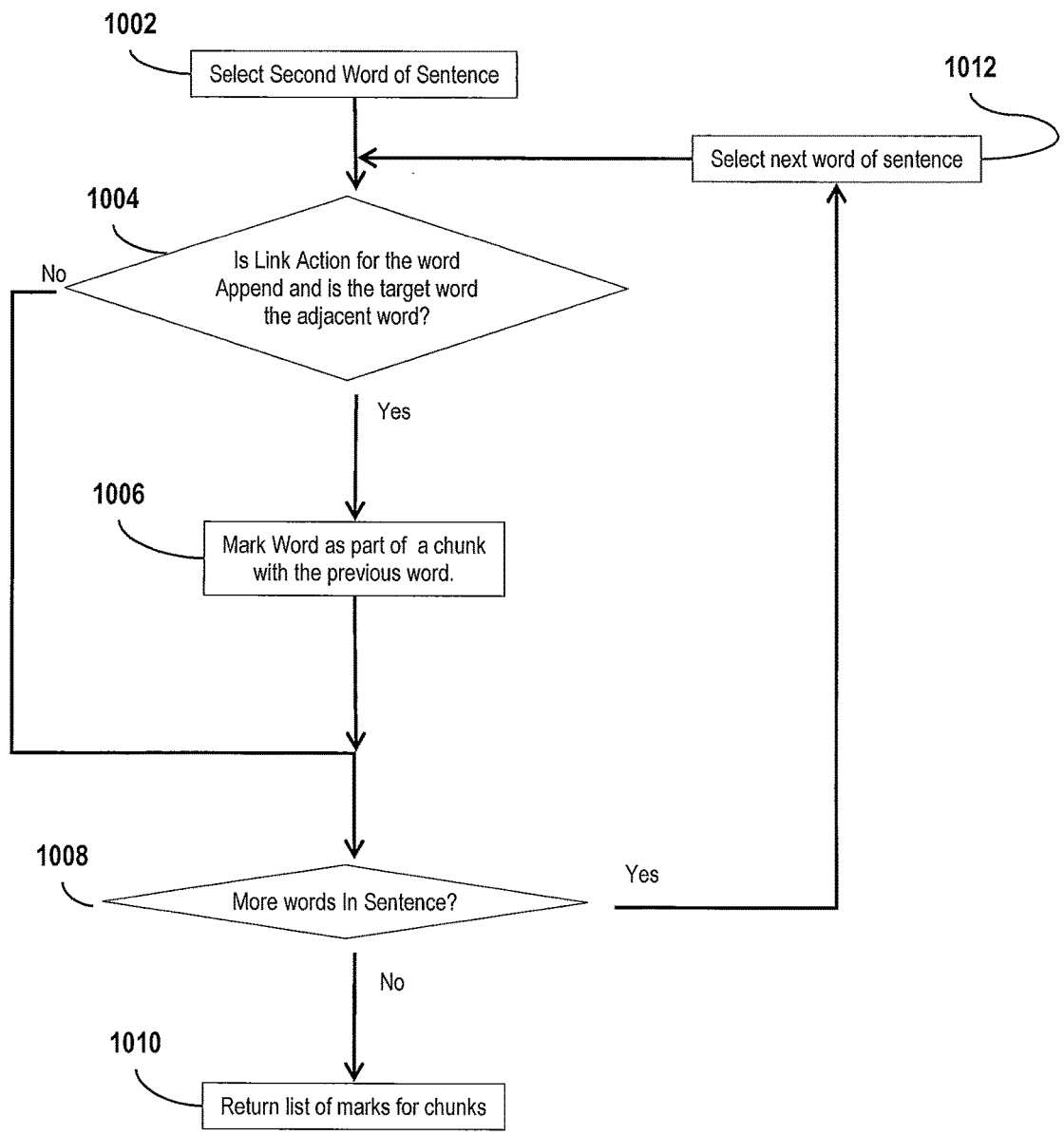

FIG. 10—Flow diagram for finding chunks in an utterance using link actions.

Figure 11A:
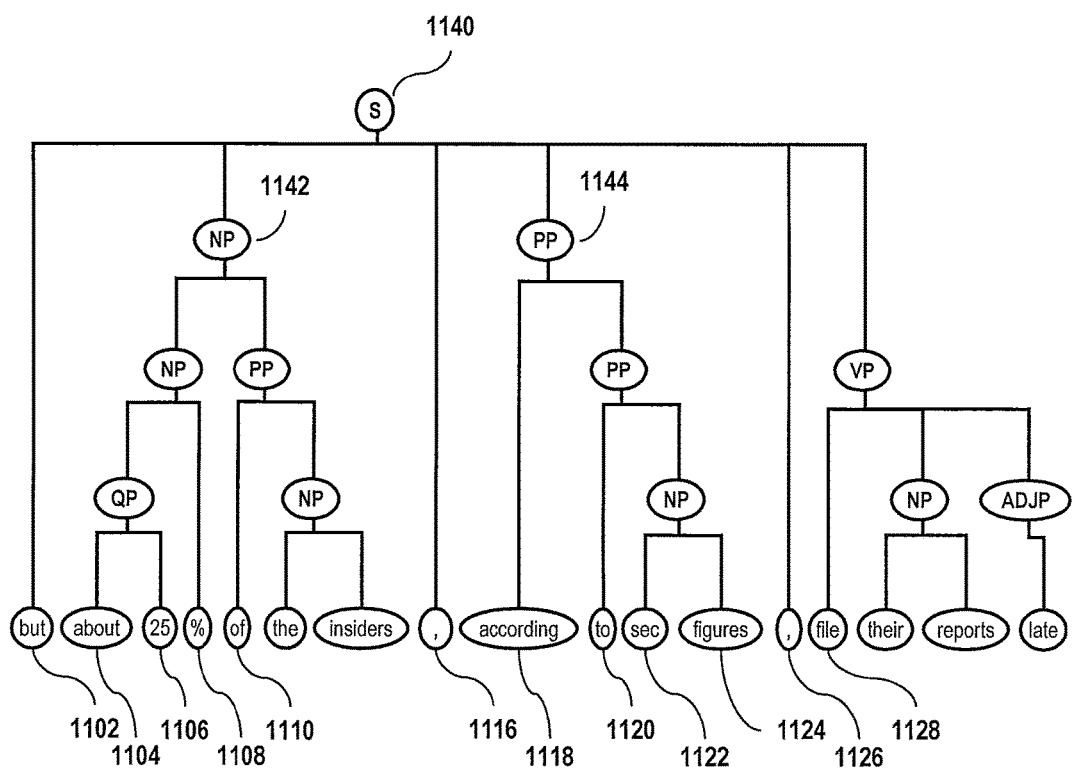

FIG. 11a—Example sentence tree structure.

Figure 11B:
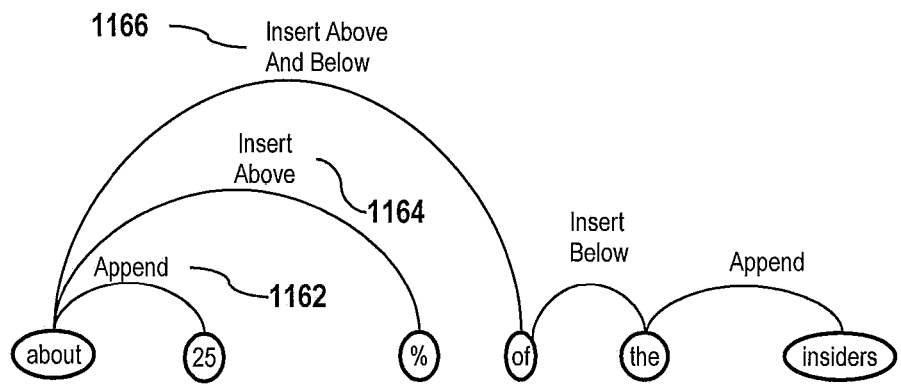

FIG. 11b—Link actions in an example upper chunk.

Figure 11C:
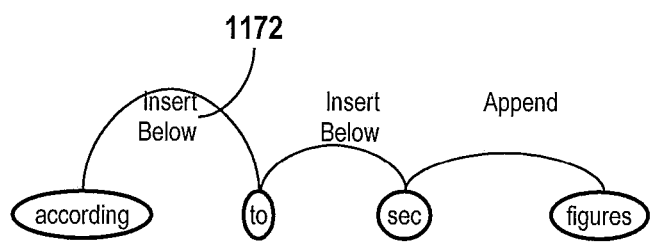

FIG. 11c—Link actions in an example upper chunk.

Figure 12:
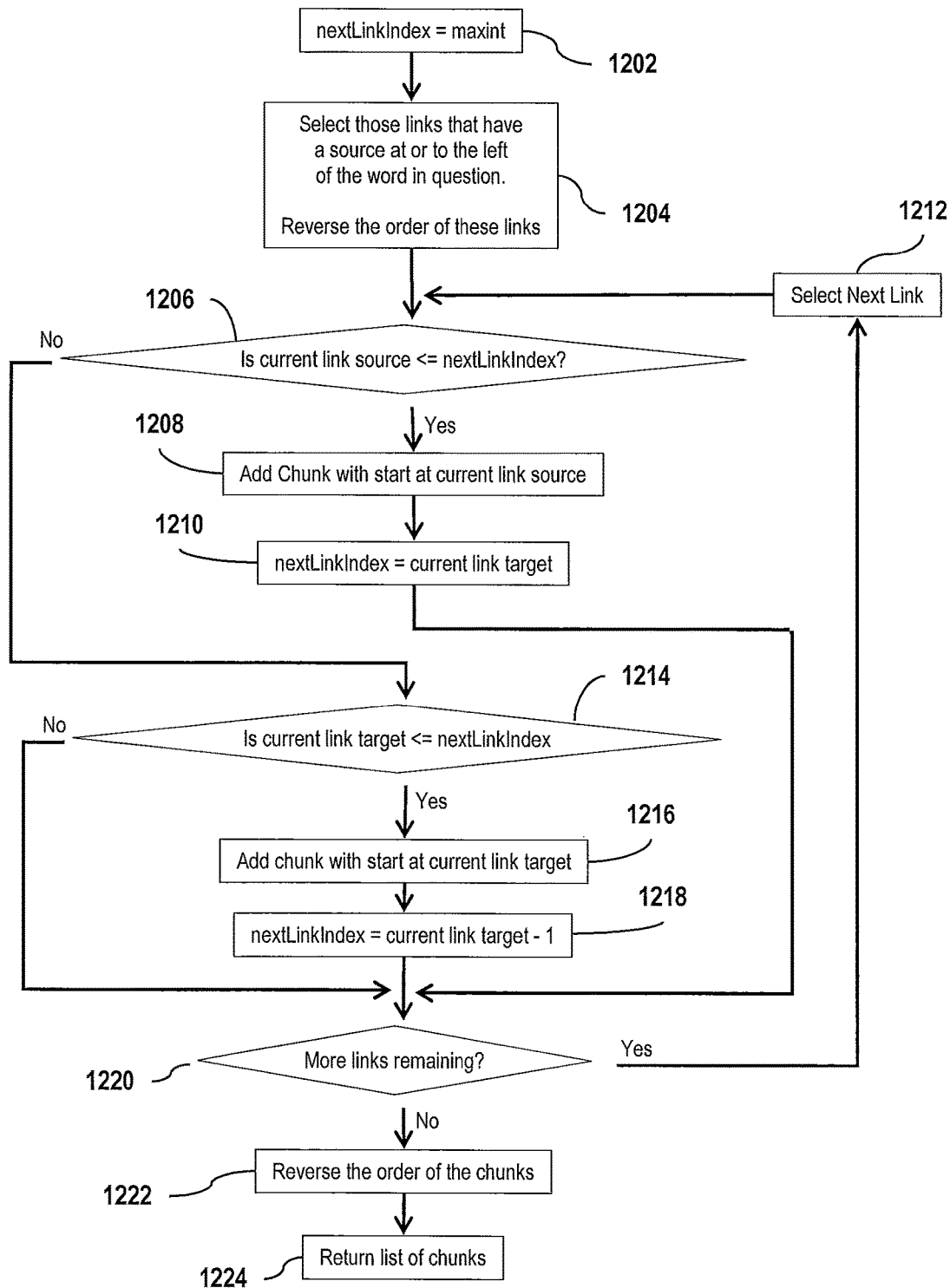

FIG. 12—Flow diagram for finding upper chunks in an utterance using link actions.

Figure 13:
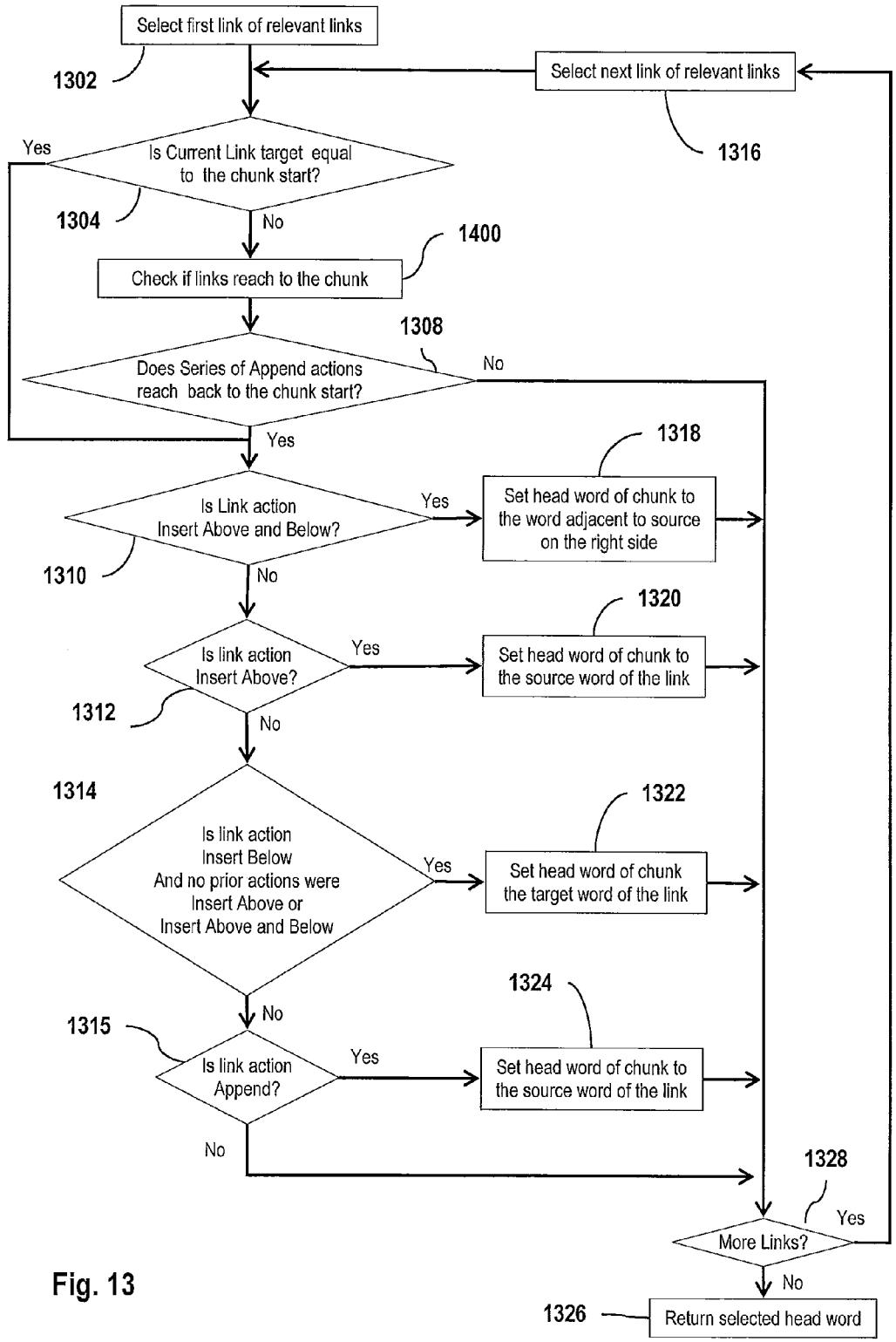

FIG. 13—Flow diagram for finding the head word of an upper chunk using link actions.

Figure 14:
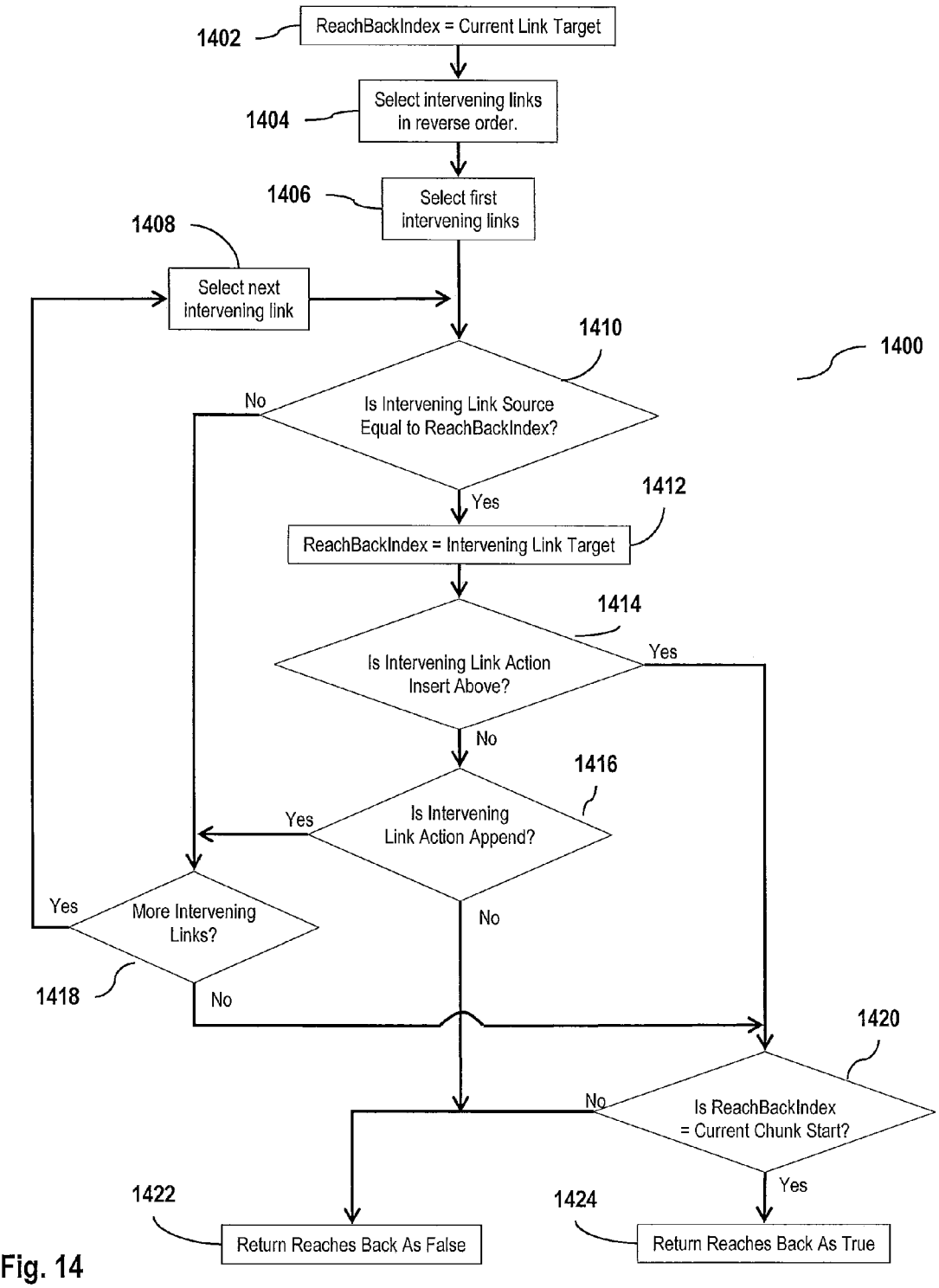

FIG. 14—Flow diagram for an inner step of FIG. 13. Check if a series of links reaches back to the start of the upper chunk.

Figure 15:
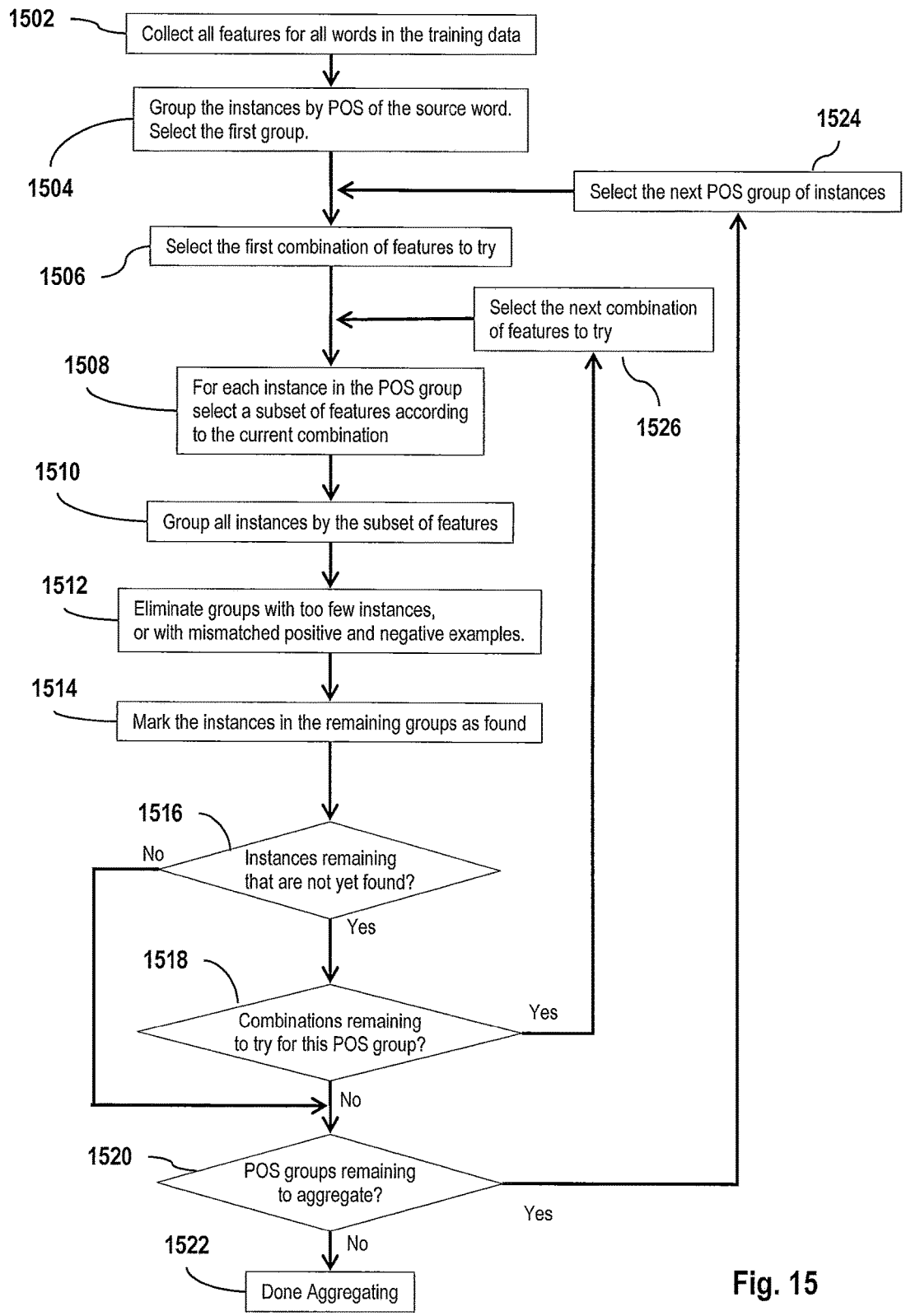

FIG. 15—Flow diagram for aggregating instances of words based on a subset of features.

FIG. 16—Example of an utterance that has been parsed using common cover links.

Figure 17:
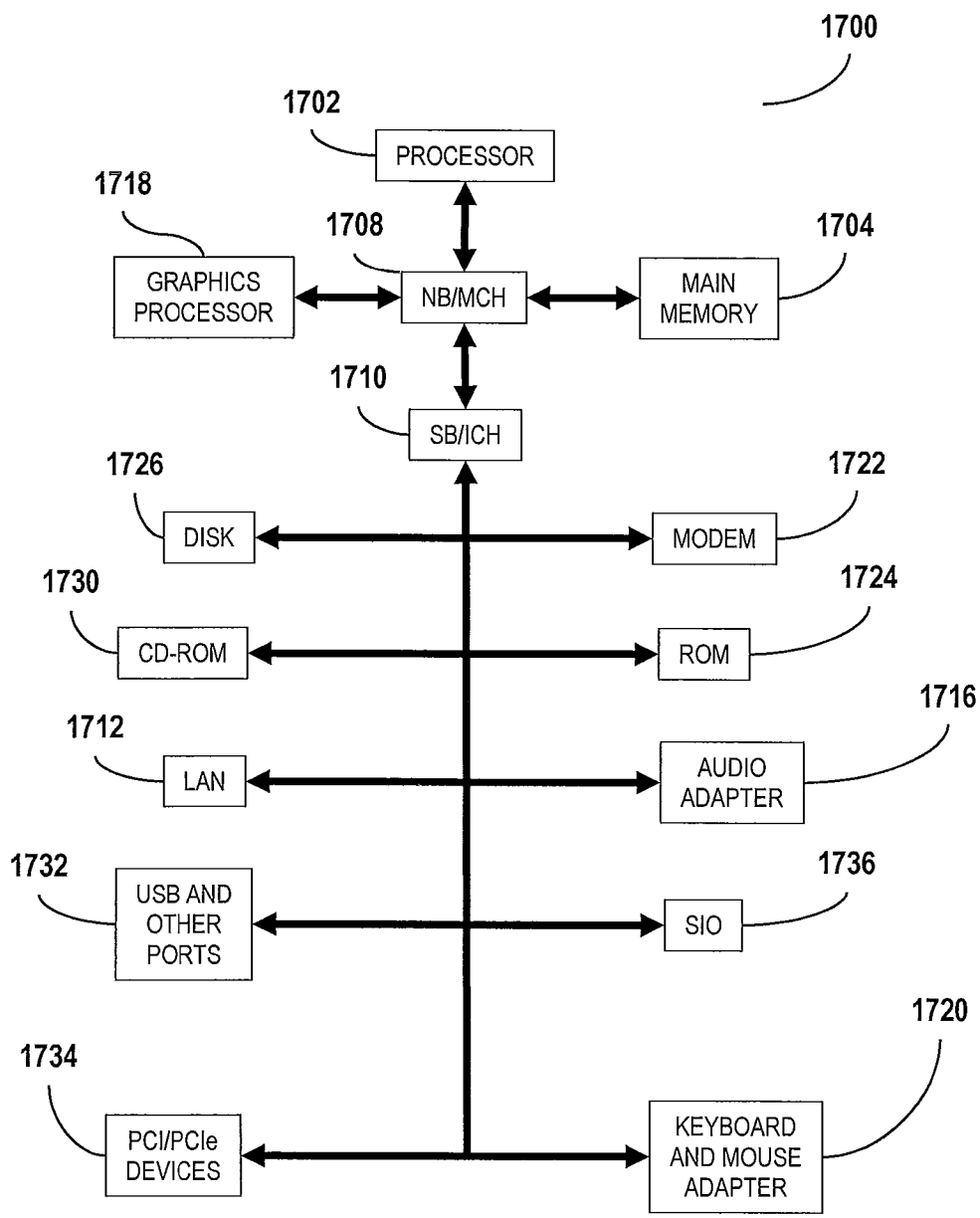

FIG. 17—Exemplary diagram of data processing environments in which the exemplary aspects of the present disclosure may be implemented.

Figure 18:
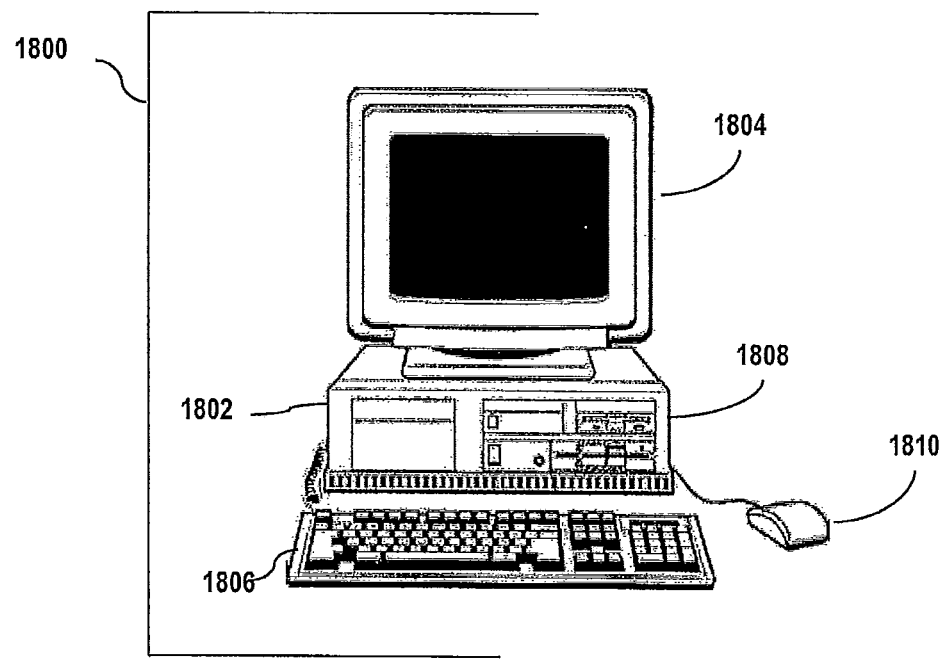

FIG. 18—Exemplary diagram of data processing environments in which the exemplary aspects of the present disclosure may be implemented.

DETAILED DESCRIPTION

Comparison with Prior Art

The embodiment is a parser of natural language utterances. The parser accesses utterances and assigns a tree structure to each utterance.

The embodiment uses a new data structure called simple links. Simple links capture the essence of a sentence tree structure in way that is reduced and compact. Each utterance that is converted to a list of simple links will be assigned N−1 simple links where N is the number of words in the utterance. For example, an utterance with 10 words will be assigned 9 simple links. Each simple link consists of a link action, the source word, and the target word. The link actions are mnemonic values that define how the tree structure is amended when a word is joined to it. These link actions are unique to the present disclosure.

Once a sentence tree structure has been converted to a list of simple links, the simple links can be converted back to the sentence tree structure so that the new tree matches exactly with the original tree. This ability to convert a tree to a list of simple links and then convert it back again, is the basis for the present parsing technique that is faster than previous parsing methods.

The present disclosure collects simple links during the training phase and creates a language model from them. The language model is different from models in previous approaches. In a CKY parser the rules that are stored in the language model are similar to "a sentence consists of a noun phrase followed by a verb phrase" and "a noun phrase consists of a determiner followed by a noun". The present disclosure takes a different approach by collecting counts of link actions between word pairs. These counts of link actions are then used during the decoding phase to decide which link actions should be assigned to words in the unseen utterance.

The present disclosure parses an unseen utterance in a stepwise manner. Many embodiments start with the second word of the utterance. For the second word and each subsequent word in the utterance, it chooses a link action and a target word that precedes the word. By comparison, a CKY parser will search through a list of rules and attempt to match a pair of words to a rule. Then the resulting pair and its rule are matched with a different rule. The CKY parser tries many possible rules in combinations until all of the words are linked with rules, and the rules are linked in a nested structure that represents the tree. The present disclosure does not attempt to create these nested rule structures, instead, the link actions define how the tree structure is created.

A Common Cover Link (CCL) parser will create links for the second and all subsequent words of an utterance. A CCL parser will generate multiple links for a given word. Each CCL link can have either a forward or backward direction between words, and also there is a depth value of 0 or 1 assigned to each link. A common cover link parser does not extract links from training data. It only generates links for an unseen utterance.

In contrast to a CCL parser, the present disclosure uses at most one link for each word of the utterance. The present disclosure assigns a link action to each link. The link action defines how the word will be attached within the syntactic tree structure of the utterance. The nature of the simple link structure and the link actions makes it so there are fewer links required than in a CCL parser.

Many embodiments of the present disclosure have performed faster than existing parsers. The speed of a parser can be measured by counting the number of words that can be parsed in a second. One test run of the present disclosure on an Intel Core i5 processor with a speed of 2.5 GHz, parsed 7486 words per second (WPS) on a single processor thread. At this speed, the parser achieved an F-Measure of 77.34. In Tsuruoka (2005), a prior art parser achieved 530 WPS with an F-Measure of 87.1 on a comparable processor. This speed improvement of 7486 WPS versus 530 WPS shows the value of the present disclosure.

Training and Decoding Phases During the Decoding Phase 120.

Several embodiments of the present disclosure consist of a training phase and a decoding phase. FIG. 1 illustrates a process flow for the training phase and the decoding phase in the parser.

The training phase 100 accesses a corpus of labeled utterances 102. The parser extracts details of the sentence tree structures from each labeled utterance in the corpus using the steps in block 200. The details that are extracted from the corpus are then stored in a language model 106.

During the decoding phase, a new or unseen utterance 122 and the training model 106 are accessed by the parser steps in block 400. The results of the parsing steps is a tree structure 124.

Extracting Details from Corpus

The method for extracting the details from the corpus for several embodiments is shown in FIG. 2. In block 202 the process of many embodiments accesses the first utterance of the corpus. In block 204, the second word of the utterance is selected. In block 300 the details for the current word are extracted. Block 300 is described in more detail in FIG. 3. In block 208 of FIG. 2, the details of the current word are stored in the language model. In decision block 210, the process checks to see if there are any more words in the utterance. If there are more words, then in block 216, the process selects the next word of the utterance. If there aren't any more words in the current utterance, then in decision block 212, the process checks to see if there are more utterances in the corpus. If there are more utterances, then in block 214, the process selects the next utterance. If there aren't any more utterances, then the extraction process is finished and the process returns from block 218.

Simple Links

Simple links is the name for a new data structure that was created in the present disclosure. Simple links are used to store the details of a sentence tree structure. A sentence tree structure can be converted to a list of simple links and then the list of simple links can be converted back to the identical structure.

In many embodiments, each simple link consists of three parts, the source word, the target word and a link action. FIG. 5 shows a sentence and the simple links that were extracted from the tree structure for the sentence. FIG. 6*i* shows the tree structure for the sentence. In many embodiments, the first word of an utterance is not assigned a simple link. Each word after the first word in the utterance is assigned a simple link. In FIG. 5, the word 'sec' 604 has a link which goes to the word 'the' 602. The word on the right end of the link is referred to as the source word and the word on the left side of the link is referred to the as the target word. The names given above each simple link in FIG. 5 are the link actions. The link action between the word 'sec' 604 and the word 'the' 602 is Append. The link action between the word 'mr.' 608 and the word 'the' 602 is Insert Above.

In FIG. 6*i*, there are 9 words in the sentence. The word "sec's" has been split into two separate words according to the conventions of the corpus. This sentence tree has 6 nodes: 3 nodes labeled NP (630, 632, 640), one labeled ADJP (638), one labeled VP (636), and one labeled S (634). There are 14 node links between the various words and nodes of the tree. When the tree is converted to a list of simple links, the 9 nodes for the words, 6 additional nodes in the tree, and 14 node links are converted into 8 simple links.

In many embodiments, there are four possible link actions: Append, Insert Below, Insert Above, Insert Above and Below.

However, the present disclosure is not limited to these link actions. Someone skilled in the art will recognize that the process could use many different pluralities of link actions.

Extracting Simple Links from a Sentence Tree Structure

The present disclosure extracts simple links from the sentence tree structures of a training corpus. Creating simple links from tree structures is a series of logical decisions based on the relationships of the words in the utterance and the nodes of the tree structure. In many embodiments, the first word of the utterance is not given a simple link. The extraction process starts with the second word of the utterance and is repeated for each subsequent word in the utterance.

FIG. 3 shows the method used for choosing the link actions in many embodiments. The process starts at block 302. In decision block 304 the process checks to see if the current word and the previous word share the same parent. For example in FIG. 6i, the words 'the' 602 and 'sec' 604 share the same parent which is the NP node 630. If this condition is found, then the link action is Append and the previous word is selected as the target word.

In decision block 306 of FIG. 3, the process checks if the parent of the current word is a child of the parent of the previous word. For example, in FIG. 6i, the word 'those' 616 has the parent node NP 640 which is a child of the VP node 636. This VP node 636 is the parent of the previous word 'disputed' 614. If this condition is found, then the link action is Insert Below and the previous word is selected as the target word.

In decision block 308 of FIG. 3, the process checks the position of the child of the common ancestor. For example in FIG. 6i, the word 'those' 616 and the word 'disputed' 614 have the VP node 636 as the common ancestor. The positions of children of a node are numbered from left to right. The ADJP node 638 is the first child (child 1) of the VP node 636. The word 'disputed' 614 is the second child (child 2) of the VP node 636. The NP node 640 is the third child (child 3) of the VP node 636. In decision block 308, since the position of the NP node 640 is 3, then the link action selected will be Insert Below, and the word 'disputed' 614 will be selected as the target word.

In decision block 310 of FIG. 3, the process compares the parent of the current word with the common ancestor. For example, in FIG. 6i, the word 'disputed' 614 has the VP node 636 as its parent. The VP node 636 is also the common ancestor of 'disputed' 614 and 'vehemently' 612. In the decision block 310, since the parent of 'disputed' 614 is the VP node 636 which is also the common ancestor, then the link action is Insert Above and the word 'vehemently' 612 is selected as the target word.

In decision block 310 of FIG. 3, if none of these conditions is true (Yes), then the link action is Insert Above and Below, and the left most descendent of the common ancestor is selected as the target word. For example, in FIG. 6i, the word 'vehemently' 612 will have a false result (No) for each of these decisions. It does not have the same parent as the previous word (decision block 304), it does not have a parent below the parent of the previous word (decision block 306), it does not have a position on the common ancestor of 3 or more (decision block 308) and its parent is not the same as the common ancestor (decision block 310). So the link action for 'vehemently' 612 is Insert Above and Below and the left most descendent which is 'the' 602 will be selected as the target word.

Selecting Link Actions and Target Words for an Example Sentence

In many embodiments, creating a list of simple links for a sentence tree structure is a repeated process for each word of the utterance starting with the second word of the utterance. This section describes the method of selecting link actions for each word of the sentence shown in FIG. 6i.

In FIG. 6i, the second word is 'sec' 604. The previous word 'the' 602 and 'sec' are both children of the same NP node 630. So the process chooses 'the' as the target word and the link action is Append.

In FIG. 6i, the third word is 's 606. The previous word 'sec' 604 and 's are both children of the same NP node 630. So the process chooses 'sec' as the target word and the link action is Append.

In FIG. 6i, the fourth word is 'mr.' 608. The parent node for 'mr.' is the NP node 632. There are not any previous words that share the same parent, so the process looks for a common ancestor of the previous word which is 's 606 and 'mr.' 608. The common ancestor of these two words is the NP node 632. From this node, the process finds the left most descendent. Since the word 'mr.' 608 has the parent node NP 632, and since this node is also the common ancestor, then the link action is Insert Above. The target word for the simple link is left most descendent which is 'the' 602.

In FIG. 6i, the fifth word is 'lane' 610. The previous word 'mr.' 608 and 'lane' are both children of the same NP Node 632. So the process chooses 'mr.' as the target word and the link action is Append.

In FIG. 6i, the sixth word is 'vehemently' 612. The parent node is the ADJP node 638. There are not any previous words that share the same parent node, so the process looks for the common ancestor of the previous word 'lane' 610 and 'vehemently' 612. The common ancestor is the S node 634. The left most descendent of the S node is 'the' 602. The process will select a link action of Insert Above and Below and select the word 'the' 602 as the target word.

In FIG. 6i, the seventh word is 'disputed' 614. There are not any previous words that share the same parent node, so the process of several embodiments looks for the common ancestor of the previous word 'vehemently' 612 and 'disputed' 614. The common ancestor is the VP node 636. The left most descendent of the VP 636 node is 'vehemently' 612. The process will select a link action of Insert Above and select the word 'vehemently' 612 as the target word.

In FIG. 6i, the eighth word is 'those' 616. There are not any previous words that share the same parent, so the process checks to see if the parent of the word is a child of the parent of the previous word. The parent of 'those' 616 is the NP node 640 which is a child of the VP node 636. The previous word is 'disputed' 614 which has the parent node VP 636. So the process will select the link action Insert Below and the word 'disputed' will be selected as the target word.

In FIG. 6i, the ninth word is 'estimates' 618. The previous word is 'those' 616 and these two words share the same parent. Since they share the same parent the link action selected is Append. The word 'those' 616 is selected as the target word.

Creating a Tree Structure from Simple Links

Creating a tree structure for an utterance is one of the primary uses of the present disclosure. A list of simple links is used and each simple link in the list is accessed one after another. An intermediate tree structure which starts as an empty tree is 'grown' by adding each successive source word of the utterance to the intermediate tree. The link actions for each word specify how the word is attached to the tree. FIGS. 6a to 6i show the successive tree structures that are created for an example sentence. Each figure shows the tree after one word with its simple link have been added. The link actions used are shown in FIG. 5.

Figure 6A:
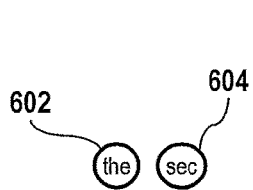
Figure 6B:
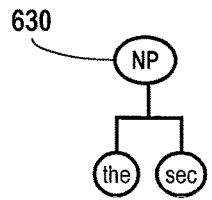

FIG. 6a shows the first two words of the sentence. The first word 'the' 602 does not have a link action assigned to it. The second word 'sec' 604 has the link action Append. The link action Append means add the word as a child to the node that is the parent of the target word. The target word for 'sec' 604 is 'the' 602. In FIG. 6a, there is not a node that is the parent the target word 'the'. So the process creates one 630, makes it the parent of 'the' and also makes it the parent of 'sec'. The result is shown in FIG. 6b.

Figure 6C:
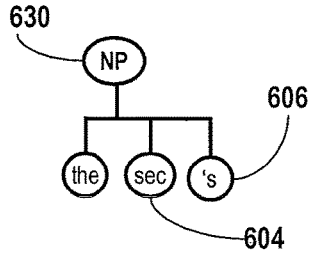

The link action for the third word 's 606 is append. The source word is 's and the target word is 'sec' 604. Since there is already a node 630 above 'sec', the process will add the word 's as a child to that node. FIG. 6c shows the result.

Figure 6D:
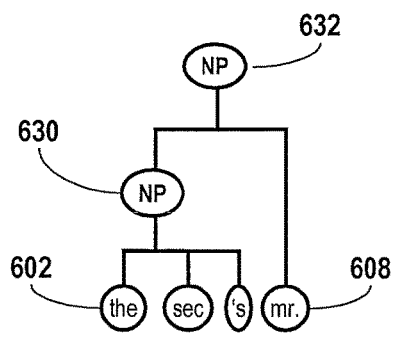
Figure 6E:
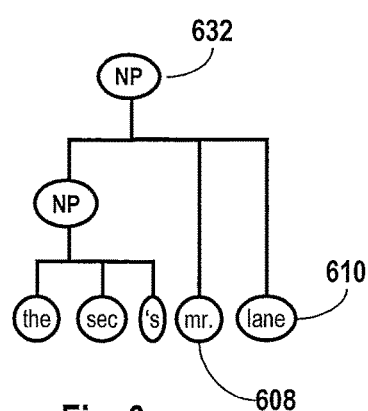

The fourth word is 'mr.' 608. Its target word is 'the' 602 and the link action is Insert Above. Insert Above means add the word as a child to the node above the parent of the target word. In this case, the parent of 'the' 602 is the node 630. There is not yet a node above 630, so the process creates one 632 and attaches it above the node 630. The process then adds 'mr.' 608 as a child to this new node 632. The result is shown in FIG. 6d.

The fifth word is 'lane' 610. The target word is 'mr.' 608 and the link action of Append. In FIG. 6d, the word 'mr.' 608 already has a parent node 632, so the process adds 'lane' 610 as a child to node 632.

Figure 6F:
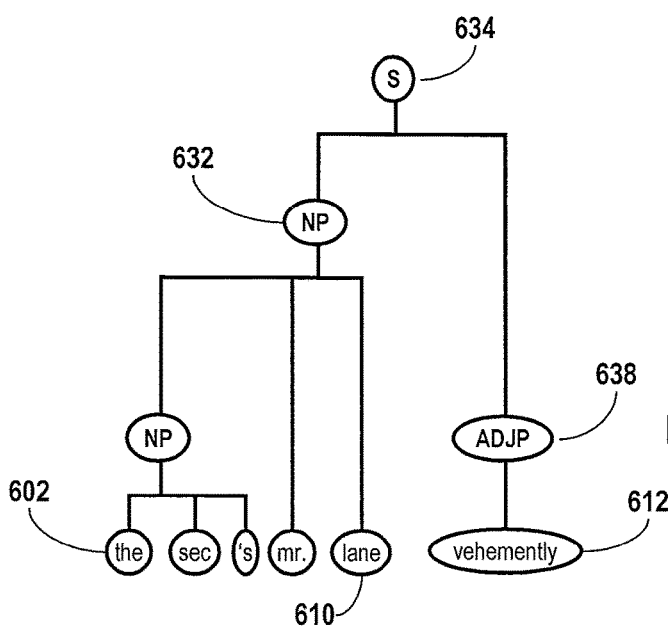

The sixth word is 'vehemently' 612. The target word is 'the' 602 with a link action of Insert Above and Below. When adding the word 'vehemently' 612, the process starts with the target word 'the' 602 and the left neighbor 'lane' 610. From these two words, the process finds the common ancestor, which is the node 632. The process will look for the parent of this common ancestor. In this case, a parent node does not exist, so it creates the node 634 and makes the node 632 a child of it. The process then creates the node 638, adds it as a child to the node 634. Finally, the process adds 'vehemently' 612 as a child of the node 638. The result is shown in FIG. 6f.

Figure 6G:
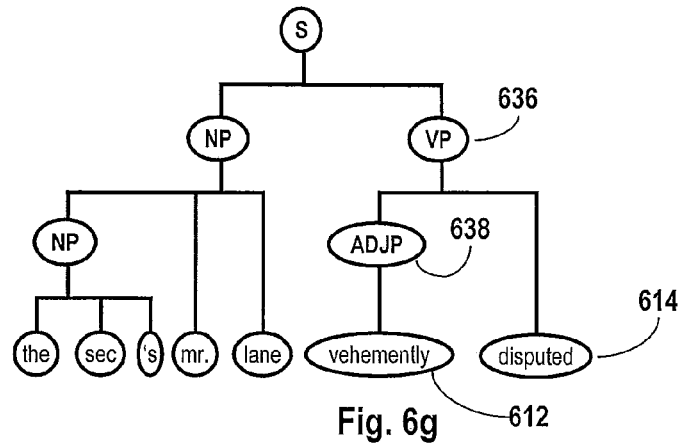

The seventh word of the sentence is 'disputed' 614. The target word is 'vehemently' 612 and the link action is Insert Above. The link action Insert Above, creates a new node above the node that is the parent node of the target word and adds the source word as a child of this new node. So as shown in FIG. 6g, the process creates the node 636 above the node 638 which is the parent of 'vehemently' 612. The process then adds 'disputed' 614 as a child to the node 636.

Figure 6H:
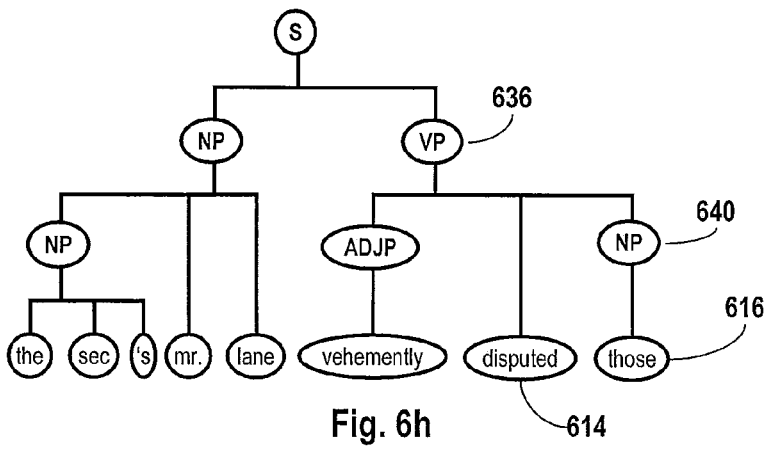
Figure 6I:
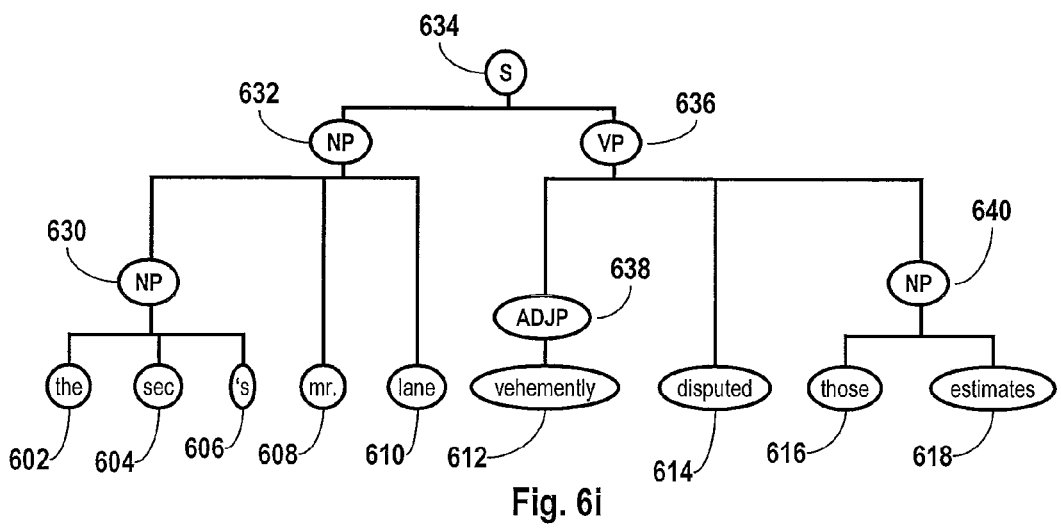

The next word is 'those' 616. The target word is 'disputed' 614 and the link action is Insert Below. This link action means add a new node below the parent node of the target word and add the source word as the child of this new node. The parent node of the target word is the node 636. The process creates the node 640 makes it a child of the node 636 and then makes 'those' 616 a child of this new node. The result is shown in FIG. 6h.

The final word of the sentence is 'estimates' 618. The target word is 'those' 616 and the link action is Append. The process will add the word as a child to the parent of the target word. In this case, the parent of the target word 'those' 616 is the node 640. The process adds 'estimates' 618 as a child to the node 640. The result is shown in FIG. 6i.

As described in the previous paragraphs, the tree structure of an utterance can be created from a set of simple links. However this process does not put phrase labels such as NP, VP, etc., on the tree nodes. Several embodiments add phrase labels to the nodes by keeping track of which labels are found for each word pair in the training data. When a node is created for a given word pair, the node label that was found most often for that word pair is added to the node that is created. Similarly phrase labels for parent nodes of new nodes can be added.

Language Model

The present disclosure creates a language model that is then used when the parser is parsing utterances. The language model is created during the training phase. FIG. 7, shows an example of the language model that is created by several embodiments. The language model is created by counting occurrences of each link action for each pair of words in the corpus. For each pair of words that are encountered, the parser counts the number of times each link action occurs in the training corpus. In FIG. 7, table 702 is an example of some of the word pairs that might be found in a corpus. For each word pair, the counts of link actions are stored in a table. Table 708 is an example of such a table of counts for a given word pair.

Many embodiments also collect counts of whether a given word pair appears as adjacent or distant. The parser calls a link 'adjacent' when the two words linked together are next to each other in the utterance. When there are one or more words intervening between the two words linked together, then the link is called a 'distant' link. For example, in FIG. 5, the words "those estimates" are next to each other in the sentence. The Append link that goes between them would be counted as an adjacent link in the language model. In FIG. 5, the word 'the' and the word 'mr.' have words between them. Thus, the link action Insert Above which is between them will be counted as a distant link in the language model. Thus, for each word pair found in the training data, there are counts of the number of times each link action occurs between the word pair when the pair is adjacent and when the pair is distant. Someone skilled in the art will recognize that the language model for a parser can be different from that described. Many embodiments create different language models from different combinations of the details from the corpus of labeled utterances. Such details include but are not limited to, the link actions, target words and source words for each simple link, and the part of speech tags for each word.

In FIG. 7, table 704 shows an example of words followed by a part of speech (POS). For each word pair encountered in the training corpus, counts of link actions are collected for the first word and the POS of the second word. Counts of link actions are also collected for the second word and the POS of the first word. This is illustrated by table 706.

Parsing

Parsing utterances with the present disclosure is performed by choosing link actions and target words for each successive source word in an unseen utterance. Several embodiments perform parsing using the method that is illustrated in FIG. 4. In block 402, the parser starts with the second word of with the utterance. In many embodiments, the first word of an utterance does not have a link assigned, so the parsing process starts with the second word. In block 404, the parser finds all possible links to words that precede the current word. If the current word is the second word of the utterance, there is only one previous word. If the current word is the third word of the utterance, there are two previous words etc.

For each of the previous words, the process finds all possible links. This means select the current word and one of the previous words as a word pair. Then find the word pair in the language model to see what link actions occur for the word pair.

As an example, consider the sentence 'the dog ran'. Imagine the parser has selected 'ran' as the current word. The previous words are 'the' and 'dog'. To find the possible links, the process will take the word pair 'the' and 'ran' and look for it in table 702 of FIG. 7. If the word pair exists, it creates a possible link using the link action that has the highest count in the table for the word pair.

Then the process takes the POS value for 'ran' which is a verb and looks for the word-POS pair 'the' and 'verb' in table 704 of FIG. 7. If it finds the word-POS pair, then it creates a possible link using the link action with the highest count in the table for the word-POS pair. Similarly, the process will look for a POS-word pair in table 706 of FIG. 7.

Different embodiments can treat this look-up process differently. For example, an embodiment might create possible links for each combination of word-pair, word-POS and POS-word that exist in the language model. Then the process would select the best link from links that were created. A different embodiment might only create a possible link from the first word-pair, word-POS or POS-pair that is found.

In FIG. 4, block 404, the process selected one or more possible links for the current selected word of the utterance. In block 406, the process chooses between the possible links for the current selected word. Different embodiments can use different mechanisms for choosing the best link. One approach is to use the possible link that had the highest count in the language model. The word pair 'the' and 'ran' might have a higher count in the language model than 'dog' and 'ran'.

In FIG. 4, decision block 408, the process checks to see if there are more words remaining in the utterance. If so, the process steps to block 414 and repeats the steps for creating possible links and selecting the best link for each word in the utterance. When there are no more words remaining in the utterance, then the list of links contains one link for each word of the utterance, except the first word. In block 410, the sentence tree structure is created using the list of links that were created. The sentence tree structure is returned in block 412.

Left Most Link Requirement

The present disclosure parses utterances by choosing a link action and also a target word for each successive source word of an unseen utterance. Choosing the target word means picking one word from all words that are to the left. For example in FIG. 5, the word 'vehemently' 612 could be linked to any of the 5 words to the left. The left most link requirement is used by several embodiments to disallow some of the words on the left. A description of left most word is given in the following paragraphs.

A simple link can link two adjacent words, or it can link two words that are separated by one or more intervening words. For example, in FIG. 5, the word 'lane' 610 links to the adjacent word 'mr.' 608. The word 'vehemently' 612 links over other words to the word 'the' 602. Whenever a word is distant (links over other words), the left most link requirement states that it must link to the left most descendent of the intervening sub-branch of the tree. An intervening sub-branch of a tree is defined for the source word and a target word as follows.

If the target word is adjacent to the source word, then the target word by itself constitutes the entire intervening sub-branch. For example in FIG. 6i, if 'disputed' 614 is the source word and 'vehemently' 612 is the target word, then the word 'vehemently' makes up the intervening sub-branch.

If the target word is distant (there are words between the source and target words), then the intervening sub-branch is made as follows: Find the common ancestor of the target word and the word that is adjacent to the source word. The intervening sub-branch is all descendants of the common ancestor. For example in FIG. 6i, consider the case of the source word is 'vehemently' 612 and the target word is 'sec' 604. The word adjacent to the source word is 'lane' 610. The common ancestor to 'lane' 610 and 'sec' 604 is the NP node 632. Thus, the intervening sub-branch consists of all the words "the sec's mr. lane".

Table 1 shows the possible pairs of words from the sentence in FIG. 6i. As shown by the Left Most Link column in the Table 1, many of the word pairs are eliminated as possible links by the left most link requirement. If an embodiment uses this requirement to eliminate possible links, then it is more efficient because it does not have to create them on the list of possible links.

TABLE 1

| Target Word | Source Word | Left Most Link |
|---|---|---|
| The | sec | Yes |
| The | 's | Yes |
| Sec | 's | Yes |
| The | mr. | Yes |
| Sec | mr. | No |
| 's | mr. | Yes |
| The | lane | Yes |
| Sec | lane | No |
| 's | lane | No |
| mr. | lane | Yes |
| The | vehemently | Yes |
| Sec | vehemently | No |
| 's | vehemently | No |
| mr. | vehemently | No |
| Lane | vehemently | Yes |
| The | disputed | Yes |
| Sec | disputed | No |
| 's | disputed | No |
| mr. | disputed | No |
| Lane | disputed | No |
| Vehemently | disputed | Yes |
| The | those | Yes |
| Sec | those | No |
| 's | those | No |
| mr. | those | No |
| Lane | those | No |
| Vehemently | those | Yes |
| Disputed | those | Yes |
| The | estimates | Yes |
| Sec | estimates | No |
| 's | estimates | No |
| mr. | estimates | No |
| Lane | estimates | No |
| Vehemently | estimates | Yes |
| Disputed | estimates | No |
| Those | estimates | Yes |

The Boolean value (Yes/No) for left most link is different depending on which source and target words are in question. For example, the words 'lane' and 'vehemently' have a true value (Yes) for the left most link. But the words 'lane' and 'disputed' have a false value (No) for the left most link. Thus, the logical value of the left most link must be recomputed for each source word in the utterance.

Finding the Left Most Link

The logical value for the left most link can be computed from the tree structure as described above, or it can be computed from the list of simple links. When embodiments compute the logical value for the left most link from the simple links, they use the simple links that have been selected so far for the utterance. For example, when computing the left most link value for the word 'disputed' 614 in FIG. 6i, the embodiment will use the simple links that were selected for all previous words up to and including 'vehemently' 612.

FIG. 9 shows the flow chart steps required to compute the left most link value for a given source word and target word in an utterance. This flow chart assumes that simple links for the words before the source word have been selected.

In decision block 902, the process checks to see if the target word is the first word of the utterance. If so, then by definition this is a left most link and the flow chart returns through block 916.

In decision block 904, we check to see if the target word is adjacent to the source word, i.e., if there are not any intervening words. If so, then by definition this is a left most link and the flow chart returns through block 916. In decision block 906, we check to see if the link action for the target word is Insert Below or Insert Above and Below. Consider the case where the source word is 'those' 616 and the target word is 'vehemently' 612 in FIG. 6i. The link action for 'vehemently' is Insert Above and Below, so the process steps to block 908. Now, consider the case where the source word is 'those' 616 and the target word is 'lane' 610. The link action for 'lane' is Append, so the result is not a left most link and the flow chart exits through block 914.

In block 908, the process selects the first intervening word between the source and target words. In the case where the source word is 'those' 616 and the target word is 'vehemently' 612, the only intervening word is 'disputed' 614.

In decision block 910, the process checks each intervening word to see if the link for the intervening word extends further to the left than the target word in question. In the case where 'those' 616 is the source word, 'vehemently' 612 is the target word and 'disputed' 614 is the intervening word, the link for 'disputed' has 'vehemently' 612 as its target word. This is not further left than the target word in question, so the process steps to block 912. As an alternate case, consider the source word 'those' 616, and the target word 'sec' 604. One of the intervening words is 'vehemently' 612. When 'vehemently' is encountered at decision block 910, the link for 'vehemently' has a target word of 'the' 602 which is further left than the target word in question, so the result is not a left most link and the flow chart will exit through block 914.

In decision block 912, the process checks to see if there are additional intervening words to check. If there are more intervening words, then the process steps to block 918 where the next intervening word is selected. If there are not any more intervening words, then the result is a left most link and the process returns through block 916.

Chunks

Several embodiments group words to create chunks of words. The chunks are used in several embodiments when selecting words that can be a target of a link. In many embodiments, the chunks are created by a process as illustrated in FIG. 10. This flow chart creates a list of Boolean values, one for each word of the utterance except the first word. When the Boolean value assigned to a word is true, it means that the word and the prior word are linked together in a chunk. Any number of words may be grouped together in this manner.

In block 1002, the process selects the second word of an utterance. The first word of an utterance does not receive one of these Boolean values.

In decision block 1004, the process checks if the link for the current word has the previous word as the target word and if the link action is Append. If both of these conditions are true, then the process goes to block 1006. If either of these conditions is false, then the process goes to block 1008.

In block 1006, the process assigns a Boolean value of true to the current word which indicates this word is grouped with the previous word as part of a chunk.

In decision block 1008, the process checks to see if there are any words remaining in the utterance. If there are words remaining, then the process goes to block 1012 and selects the next word. If there are not any more words, then the process goes to block 1010 and returns the list of Boolean values that were assigned to the words of the utterance.

Upper Chunks

Several embodiments group words together to form upper chunks. Upper chunks are a means of collecting a group of words so they can be treated as a single entity. Within an utterance the upper chunks that precede a given word are used to indicate the environment for the word. The upper chunks are different depending on which word is in question. Upper chunks for an utterance are different than the chunks that are described in the previous section.

FIG. 11a shows a sentence that illustrates upper chunks as they are implemented in several embodiments. Table 2 compares the upper chunks of the words 'figures' 1124 and 'file' 1128. Items marked Yes in the table are words that are the beginning of upper chunks in the sentence for the two given words.

TABLE 2

| Starts Upper Chunk | 'figures' | 'file' |
|---|---|---|
| 1102 'but' | Yes | Yes |
| 1104 'about' | Yes | Yes |
| 1116 ',' | Yes | Yes |
| 1118 'according' | Yes | Yes |
| 1120 'to' | Yes | No |
| 1122 'sec' | Yes | No |
| 1124 'figures' | — | No |
| 1126 ',' | — | Yes |

Upper chunks can be created for an utterance using the simple links that have been selected for the utterance. FIG. 12 shows a method for creating upper chunks that is used by many embodiments.

In block 1202, the process creates a variable to keep track of the next link index of interest.

In block 1204, the process selects the links for the utterance. The links selected have a source word that is either the word in question, or is to the left of the word in question. The process reverses the order of the links so the loop starts at the word in question and steps right to left through each link toward the beginning of the utterance.

In decision block 1206, the process compares the index of the source word of the current link with the variable created in block 1202. If the current link source index is to less than or equal to the value of the variable, then the process steps to block 1208. If this condition is false, then the process steps to block 1214.

In block 1208, the process creates a new chunk. The start location of the chunk is the index of the source word of the current link. The new chunk is added to the list of chunks that will be returned at the end.

In block 1210, the process sets the value of next Link Index to the index of the target word of the current link.

In decision block 1214, the process checks if the index of the current link target is less than or equal to the next link index variable. If the condition is true, the process steps to block 1216. If it is false, the process steps to block 1220.

In block 1220, the process checks to see if there are more links. If there are more links, the process steps to block 1212 where the next link is selected. If all links have been used, then the process steps to block 1222.

In block 1222, the process reverses the order of the chunks in the list that has been created. Since we were processing links in a right to left manner and adding chunks in this order, the process reverses the order so the list is in the left to right order of the utterance.

In block 1224, the list of upper chunks is returned.

Upper Chunk Head Words

An upper chunk in an utterance can consist of one or more words. For example in the sentence in FIG. 11*a*, if the word in question is 'file' 1128, then there are 5 upper chunks: "but", "about 20% of the insiders", ",", "according to sec figures" and ",". Three of these upper chunks consist of a single word. The other two upper chunks consist of multiple words.

When using upper chunks to determine the environment for a word, it is necessary to choose a single word from each upper chunk as the head of the upper chunk. The head word represents the entire upper chunk, so it is best if the word has a POS that is the same as the phrase that contains the upper chunk. In FIG. 11*a*, the upper chunk "about 25% of the insiders" has the NP node 1142 as its top node. In this case it would be best to choose one of the nouns in the upper chunk as the head word. Similarly, the upper chunk "according to sec figures" has the PP node 1144 as its top node. For this upper chunk it would be best to choose a preposition as its head word.

Different embodiments of the present disclosure use different strategies for choosing the head for a given upper chunk. One method is to simply use either the first or last word of the chunk. If we choose the first word as the head word for upper chunks, the first example taken from FIG. 11*a* ("about 25% of the insiders") would get 'about' which is a preposition. The preferred value is noun so the first word is incorrect. In the second example ("according to sec figures"), the first word is 'according' which is a preposition. The preferred value is preposition. As shown, this strategy gets one right value and one wrong value for the example sentence.

FIGS. 13 and 14 show a different method of choosing the head word for an upper chunk which is used in several embodiments. The method uses link actions for the upper chunk to choose the appropriate word as the head of the chunk. The method shown in FIGS. 13 and 14 is repeated for every upper chunk that has more than one word.

In block 1302, the process selects a list of all the simple links that are in the range of the upper chunk. In the upper chunk "about 25% of the insiders", there are 6 words and 5 simple links. The links are shown in FIG. 11*b*. To start the process, the first link from this list is selected.

In decision block 1304, the process checks if the target of the current link is the start of the chunk. For example, in FIG. 11*b*, the Append link 1162 has its target set to 'About' which is the start of the chunk. If the condition is true, then the process steps to block 1310. If not, then the process steps to block 1400. Block 1400 will check if the current link is part of a series of links that reaches back to the start of the chunk. This is explained in more detail below.

In decision block 1308, the process checks the result of block 1400. If the current link is part of a series that reaches back to the start of the chunk, then the process steps to block 1310. If not, then the process steps to block 1328 to consider the next link.

In decision block 1310, the process checks the link action of the current link. If the action is Insert Above and Below, then the process steps to block 1318. In block 1318 the process sets the head word of the chunk to the word that is left adjacent to the source word of the link. An example of this is found in FIG. 11*a*, the word 'of' 1110.

In decision block 1312, the process again checks the link action of the current link. If the action is Insert Above, then the process steps to block 1320. In block 1320, the process sets the head word of the chunk to the source word of the link. In FIG. 11*a*, the word '%' 1108 has the link action Insert Above 1164, so the word '%' would be chosen as the head word of the chunk.

In decision block 1314, the process checks the link action of the current link. If the action is Insert Below, and if for the links so far on this chunk, none of the links have been Insert Above or Insert Above and Below, then the process steps to block 1322. In block 1322, the process sets the head word to the target word of the link. An example of this is in FIG. 11*c*, the Insert Below link 1172. The head word of the chunk will be set to 'according' 1118.

In decision block 1315, the process again checks the link action of the current link. If the action is Append, then the process steps to block 1324. In block 1324, the process sets the head word of the chunk to the source word of the link. An example of this is the Append Link 1162 in FIG. 11*c*. When the process encounters this link it will set the head word of the chunk to '25' 1106.

If none of the conditions in blocks 1310, 1312, 1314 or 1315 are true, then the process will step directly to block 1328 and check for more relevant links for the chunk. If there are more links, the process steps to block 1316, selects the next link and continues on to block 1304.

Since the process steps through all of the relevant links, the value of the head word for the chunk may be set more than once in either of blocks 1318, 1320, 1322 or 1324. When no more links are found for the chunk in decision block 1328, the most recent value of the head word will be returned at block 1326.

Block 1400 of the FIG. 13, is expanded in FIG. 14. The process gets to block 1400 when a link is found that does not reach to the beginning of the chunk. The steps in FIG. 14 determine if there are a series of links that correctly link the current link to the beginning of the chunk. The series of links can only have link actions Append or Insert Above.

In block 1402, the process sets the value of a variable ReachBackIndex to the target index of the current link. In block 1404, the process makes a list of all links for the chunk that are between the start of the chunk and the current link. This list is referred to as intervening links. The order of this list is reversed so they are processed in right to left order. In block 1406, the process selects the first of these intervening links.

In decision block 1410, the process checks if the current intervening link has a source value that equals the ReachBackIndex. This check is because the process is looking for a series of links that are connected end-to-end. If a match is found, the process steps to block 1412. In block 1412, the process sets the value of ReachBackIndex to the target of the current intervening link.

In decision block 1414, the process checks if the link action of the current intervening link is Insert Above. If the series of links connects to a link with Insert Above, then the Insert Above must be the last link of the series. If Insert Above is found, the process steps to decision block 1420. If not, the process steps to block 1416.

In decision block 1416, the process checks if the link action is Append. If so, then the process steps to block 1418 to check if there are more intervening links to be checked. If the action is a different value, the process steps to block 1422 and returns with a value indicating that the current link does not reach back to the start of the chunk.

If the process finds an Insert Above action in block 1414, or if no more intervening links are found in block 1418, the process steps to decision block 1420. Here the value of ReachBackIndex is compared with the start of the current chunk. If they are equal, then the process found a series of links that reaches back and the true value is returned at block 1424. Otherwise a false value is returned at block 1422.

Using Upper Chunks to Specify an Environment

In linguistics, the environment for a word are the words and/or phrases that come before or after the word in question. Several embodiments use upper chunks to specify the environment of words in the training and decoding phases. In FIG. 11a, the word 'file' 1128 has the upper chunks as shown in Table 3.

TABLE 3

| Upper Chunk | Head Word | POS for Head Word | Link Action |
|---|---|---|---|
| But | but | CC (coordinating conjunction) | -empty- |
| about 25% of the insiders | % | NN (noun) | Insert Below |
| , | , | comma | Append |
| according to sec figures | according | IN (preposition) | Insert Below |
| , | , | comma | Append |

The details of this environment can be used during the decoding phase to choose the correct simple link for a word. If the parser finds the word 'file' and the environment that precedes the word is identical to that shown in Table 3, then the parser should choose the same link action and target word as in this utterance. In other words, if a word and its environment match a word that was found in the training corpus, then the link action and target word should be the same as in the training data. Of course, this is a very unlikely situation. Very few utterances have exactly the same structure. So the parser will almost never find a word and an environment that matches exactly to the training data.

However, there are ways for aggregating the training data so that the parser can find matches between the training data and the utterances to be parsed. In Table 3, the head word, POS and link action are given for each of the five upper chunks that preceded 'file' in the sentence. These fifteen items are called features. Two additional features are the word itself ('file') and the POS of the word. The term 'feature' comes from the field. Features are artifacts that can be identified in the sentence that characterize the specific instance of the specific word.

Combining the fifteen features from the five upper chunks and the two features from the word itself gives seventeen features that can be used to decide which link action is best for the source word. This same set of features can be collected for every word in the training corpus. I.e., for every word, find the five upper chunks that precede it and collect the head word, POS and link action. Some words don't have five upper chunks preceding them because the word is too close to the start of the utterance. In this case, some of the feature slots are left empty. For example the link action for the first chunk in Table 3 is empty because there is not a link for the first word of an utterance.

One way to aggregate the features for all words in the training corpus is to find overlap of some but not all of the features. The object is to find groups of words that have some features the same and ignore the rest of the features. For example the word 'file' is found 42 times in the Penn Treebank corpus. If there are multiple examples of 'file' where the preceding two upper chunks have head words of 'according' and ',', and if those examples also have the same link action and target word, then the parser could aggregate those samples.

Instances of words that have a common subset of features as well as the same link action and target are called positive training examples. Instances of those words that have the common subset of features, but the link action or target are different are called negative training examples. This method of aggregation attempts to find sets of features for a word that have multiple positive training examples and no negative training examples. If this is found, then during the decoding phase, if the parser finds the word and the specific set of features, it will assign the link action and target word that occurred in the training examples.

When looking for the aggregated words and features during the training phase, the process may find a set of instances with both positive and negative examples. I.e., there may be instances of a given word that have the same features in the environment, but the link action or target word are different. The aggregation process will discard these instances and then try a different set of features from the available set. The process can first try all single features by themselves, then try all combinations of two features, and then three features. This could continue until all possible subsets of all features have been tried. In practice, searching this many subsets of features takes too much computer time. The search is limited to all subsets up to some number of features. The set of seventeen features that have been discussed so far could for example, be limited to subsets with up to five features.

Aggregating Instances with Variable Sets of Features

FIG. 15 shows a method that is used in several embodiments to aggregate the features for words in training data. In this particular method, the source word instances are grouped by their POS. Each instance is assigned a Boolean value 'state' that indicates if the link for the instance was of a given distance. The system performs this aggregation method for a set of possible distances. For example, the distance may be 1 which means the link is to the adjacent word, or the distance may be 2 which means the link skips over one intervening word. The method in FIG. 15 is repeated for each distance of interest. When the process is using a distance value of N, then the state value of a given instance will be true if the link distance of that instance is N, otherwise the state value will be false.

In block 1502, the process collects all features of all words in the training corpus.

In block 1504, the instances are grouped by the POS of the source word. All instances of nouns are grouped, all instances of verbs, etc.

In block 1506, a value is selected from the list of possible feature subsets. The process will eventually try all subsets of features, but here we are selecting the first subset from the list.

In block 1508, the process selects all features of the current subset of features for each instance in the current POS group.

In block 1510, the instances are put into groups that have identical values for each of the features in the subset. Some of the groups will have a single instance because there is only one instance that has that unique set of feature values for the subset. Some groups will have many instances. If within a group, all instances have a state value of true, then the instances are marked 'found'. Likewise, if all instances in the group have a state value of false, then the instances are also marked 'found'. If the instances of the group have mixed state values of true and false, it means the set of features is not discriminative—the features do not discriminate instances with a true state value from instances with a false state value. These instances are left unmarked and will be evaluated further with different subsets of features. Thus in block 1512, the process eliminates groups of instances with mismatched state values. Also if a group has a small number of instances it will be eliminated. The size threshold for whether a group is eliminated for being too small can be adjusted to improve the results of the parser as described below. In block 1514, the process marks the instances in any group that is remaining as 'found'.

In block 1516, the process checks to see if all instances for the current POS group have been marked 'found'. If so, then the process steps to block 1520 to start processing the next POS group.

In block 1518, the process checks to see if there are possible subsets of features remaining to try for aggregating this POS group. If there are, the process steps to block 1526 to select the next subset.

In block 1520, the process checks to see if there are POS groups remaining to aggregate. If there are, then the process steps to block 1524 to start processing the next POS group. If not, then the aggregation steps are finished and the process exits through block 1522.

Someone skilled in the art will recognize that the details of aggregation given have much room for flexibility. For example, instead of five preceding upper chunks, the process could choose a different number such as four or six chunks. These variations have been exemplified in many embodiments. The reason for trying different variations of the aggregation process is to improve the resulting F-Measure of the parser. During development, a given aggregation is tried and the F-Measure value is collected. Then the aggregation is modified in some way and the resulting F-Measure is compared with the prior value. Through trial and error, a set of parameters for the aggregation process that results in the best F-Measure, can be selected.

Maximum Entropy

Maximum Entropy is a statistical classifier that can be used for classifying words of an utterance. The Maximum Entropy classifier can be trained on the feature set from the training corpus that was described in the section above on aggregating features. The feature set can be as described in the section above on aggregating features. Someone skilled in the art would recognize the feature set can also be selected in a different manner. The number of Maximum Entropy classifiers could be only a few or many in order to maximize the performance of the parser. For each word in an unseen utterance, the Maximum Entropy classifier can be used to pick the best target word and link action for a simple link. Someone skilled in the art would recognize that another form of statistical classifier such as but not limited to Naive Bayes, Support Vector Machines or Decision Trees, could be used in place of the Maximum Entropy classifier.

Computer Hardware

The present disclosure includes a data processing device. Such devices include but not limited to, a laptop computer, a mobile device such as a cell phone, a hand held device, a gaming device, or a desk top device such as shown in FIG. 18. The data processing device may also be a distributed data processing system in which multiple computing devices are utilized to perform various aspects of the disclosure. FIGS. 17 and 18 are provided as exemplary diagrams of data processing environments in which the exemplary aspects of the present disclosure may be implemented. It should be appreciated that FIGS. 17 and 18 are only exemplary and are not intended to assert or imply any limitation with regard to the environments in which the exemplary aspects of the present disclosure may be implemented. Many modifications to the depicted environments may be made without departing from the spirit and scope of the exemplary embodiments described herein.

With reference now to the figures and in particular with reference to FIG. 18, a pictorial representation of a data processing system in which the exemplary aspects of the present disclosure may be implemented is depicted. A computer 1800 is depicted which includes, for example, system unit 1802, video display terminal 1804, keyboard 1806, storage devices 1808, which may include floppy drives and other types of permanent, rewritable, and removable storage media, and mouse 1810. Additional input devices may be included with personal computer 1800, such as, for example, a joystick, touchpad, touch screen, trackball, microphone, and the like.

Computer 1800 may be implemented using any suitable computer. Although the depicted representation shows a computer, other embodiments of the exemplary aspects of the present disclosure may be implemented in other types of data processing systems, such as a network computer, for example. Computer 1800 also may include, for example, a graphical user interface (GUI) that may be implemented by means of systems software residing in computer readable media in operation within computer 1800.

With reference now to FIG. 17, a block diagram of a data processing system is shown in which the exemplary aspects of the present disclosure may be implemented. Data processing system 1700 is an example of a computer, such as computer 1800 in FIG. 18, in which code or instructions implementing the exemplary processes of the present disclosure may be located. In the depicted example, data processing system 1700 employs, for example, a hub architecture including a north bridge and memory controller hub (MCH) 1708 and a south bridge and input/output (I/O) controller hub (ICH) 1710. Processor 1702, main memory 1704, and graphics processor 1718 are connected to MCH 1708 in the depicted example. Graphics processor 1718 may be connected to the MCH through an accelerated graphics port (AGP), for example.

In the illustrated example, local area network (LAN) adapter 1712, audio adapter 1716, keyboard and mouse adapter 1720, modem 1722, read only memory (ROM) 1724, hard disk drive (HDD) 1726, CD-ROM driver 1730, universal serial bus (USB) ports and other communications ports 1732, and PCI/PCIe devices 1734 may be connected to ICH 1710. PCI/PCIe devices may include, for example, Ethernet adapters, add-in cards, PC cards for notebook computers, etc. PCI uses a cardbus controller, while PCIe does not. ROM 1724 may be, for example, a flash binary input/output system (BIOS). Hard disk drive 1726 and CD-ROM drive 1730 may use, for example, an integrated drive electronics (IDE) or serial advanced technology attachment (SATA) interface. A super I/O (SIO) device 1736 may be connected to ICH 1710.

An operating system runs on processor 1702 and is used to coordinate and provide control of various components within data processing system 1700 in FIG. 17. The operating system may be, for example, a commercially available operating system such as the WINDOWS 7 operating system, which is available from Microsoft Corporation. An object oriented programming system, such as the C# (pronounced "see sharp") programming language, may run in conjunction with the operating system and provides calls to the operating system from the C# programming language programs or applications executing on data processing system 1700. Instructions for the operating system, the object-oriented programming system, and applications or programs are located on storage devices, such as hard disk drive 1726, and may be loaded into main memory 1704 for execution by processor 1702. The exemplary processes of the present disclosure may be performed by processor 1702 using computer implemented instructions, which may be located in a memory such as, for example, main memory 1704, memory 1724, or in one or more peripheral devices 1726 and 1730.

Those of ordinary skill in the art will appreciate that the hardware in FIG. 17 may vary depending on the implementation. Other internal hardware or peripheral devices, such as flash memory, equivalent non-volatile memory, or optical disk drives and the like, may be used in addition to or in place of the hardware depicted in FIG. 17. Other programming languages may be used, including but not limited to C, C++, or Python.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A method for improving a processor in communication with a memory storing a program which uses a parser to parse natural language text, said method comprising:
   (a) training said parser by accessing a corpus of labeled utterances;
   (b) using said parser to extract details from said corpus, where said details include at least two simple links, where the simple link consists of a source word in the utterance, a target word in the utterance that is distinct from said source word, and a link action, said link action is chosen from a set of link actions which includes at least 2 of Append, Insert Below, Insert Above, and Insert Above and Below;
   (c) said parser selects the target word and link action for a simple link by performing determination steps and repeating the determination steps until each source word has an associated simple link, where the determining steps include:
      i. finding a common ancestor of a source word and a previous word, finding a left-most descendent of the common ancestor, and assigning the left-most descendent of the common ancestor as the target word of the simple link,
      ii. determining if a parent of the source word is also a parent of the previous word, and if so, the link action selected is Append;
      iii. determining if the parent of the source word is a child of the parent of the previous word, and if so, the link action selected is Insert Below;
      iv. finding a child node of the common ancestor that is a parent or ancestor to the source word, and determining a position of the child node, which position will be numbered sequentially, and if the position of the child is 3 or greater, the link action selected is Insert Below;
      v. determining if the parent of the source word is the same as the common ancestor and the parent of the target word is not the common ancestor, then the link action is Insert Above; and
      vi. determining if none of the previous conditions exist, the link action selected is Insert Above and Below;
   (d) said parser uses at least one statistical classifier by training said statistical classifier on said details that were extracted from said corpus;
   using said parser to create a language model using said details;
   (f) using said language model to generate at least one new simple link for at least one source word in at least one additional utterance by using said statistical classifier to choose a target word and link action for the new simple link; and
   (q) outputting the results of said parsing of the additional utterance as an array of simple links with the additional utterance.

2. The method of claim 1, wherein said details also include part of speech tags.

3. A method of claim 1 wherein said parser creates said simple links for said additional utterance, and said simple links are in number no more than one for each word of said utterance.

4. The method of claim 1 where the aggregate rate of generating simple links is greater than or equal to 7846 simple links per second.

5. A non-transitory computer-readable storage medium having instructions that develop a parser for use in natural language processing, the instructions comprising:
   (a) training said parser by accessing a corpus of labeled utterances;
   (b) using said parser to extract details from said corpus, where said details include at least two simple links, where the simple link consists of a source word in the utterance, a target word in the utterance that is distinct from said source word, and a link action, said link action is chosen from a set of link actions which includes at least 2 of Append, Insert Below, Insert Above, and Insert Above and Below;
   (c) said parser selects the target word and link action for a simple link by performing determination steps and repeating the determination steps until each source word has an associated simple link, where the determining steps include:
      i. finding a common ancestor of a source word and a previous word, finding a left-most descendent of the common ancestor, and assigning the left-most descendent of the common ancestor as the target word of the simple link,
      ii. determining if a parent of the source word is also a parent of the previous word, and if so, the link action selected is Append;
      iii. determining if the parent of the source word is a child of the parent of the previous word, and if so, the link action selected is Insert Below;
      iv. finding a child node of the common ancestor that is a parent or ancestor to the source word, and determining a position of the child node, which position will be numbered sequentially, and if the position of the child is 3 or greater, the link action selected is Insert Below;

v. determining if the parent of the source word is the same as the common ancestor and the parent of the target word is not the common ancestor, then the link action is Insert Above; and vi. determining if none of the previous conditions exist, the link action selected is Insert Above and Below;

(d) said parser uses at least one statistical classifier by training said statistical classifier on said details that were extracted from said corpus;

(e) using said parser to create a language model using said details;

(f) using said language model to generate at least one new simple link for at least one additional utterance where the new link action is from a set which includes Append, Insert Below, Insert Above, Insert Above and Below; and (g) outputting the results of said parsing of the additional utterance as an array of simple links with the additional utterance.

6. The medium of claim 5, wherein said details also include syntactic tree structures.

7. The medium of claim 5, wherein said details also include part of speech tags.

8. The nontransitory computer-readable storage medium of claim 5 wherein said parser creates said simple links for said additional utterance, and said simple links are in number no more than one for each token of said utterance.

9. A method for providing an improved natural language parser to a memory unit of a computer system having a system processor, the method comprising the steps of:

training said parser by accessing a corpus of labeled utterances;

using said parser to extract details from said corpus, where said details include at least two simple links, where the simple link consists of a source word in the utterance, a target word in the utterance that is distinct from said source word, and a link action, said link action is chosen from a set of link actions which includes at least 2 of Append, Insert Below, Insert Above, and Insert Above and Below;

said parser selects the target word and link action for a simple link by performing determination steps and repeating the determination steps until each source word has an associated simple link, where the determining steps include:

i. finding a common ancestor of a source word and a previous word, finding a left-most descendent of the common ancestor, and assigning the left-most descendent of the common ancestor as the target word of the simple link, ii. determining if a parent of the source word is also a parent of the previous word, and if so, the link action selected is Append;

iii. determining if the parent of the source word is a child of the parent of the previous word, and if so, the link action selected is Insert Below;

iv. finding a child node of the common ancestor that is a parent or ancestor to the source word, and determining a position of the child node, which position will be numbered sequentially, and if the position of the child is 3 or greater, the link action selected is Insert Below;

v. determining if the parent of the source word is the same as the common ancestor and the parent of the target word is not the common ancestor, then the link action is Insert Above;

vi. determining if none of the previous conditions exist, the link action selected is Insert Above and Below;

(d) responding to a request from a service to transfer and temporarily store in a memory location a copy of a user utterance configured for effective use of a system processor; and (e) parsing the utterance into an array of simple links by creating at least one simple link between at least two words of the new utterance, where a link action is selected from a set which includes Append, Insert Below, Insert Above, Insert Above and Below; and (f) making the array of simple links available for future requests from a service.

10. A method for accessing a language model in a data storage system of a computer system having means for reading and writing data from the data storage system, relaying information, and accepting input generated by a user, parsing the user generated input, the method comprising the steps of:

(a) initially creating the language model by accessing a corpus of labeled utterances and generating details, said details consisting of a plurality of simple links, each simple link defining a relationship between at least two words of an utterance, where the relationship consists of a source word of an utterance, a target word in the utterance, and a link action, said link action is chosen from a set of link actions which includes Append, Insert Below, Insert Above, and Insert Above and Below:

(b)

said parser selects the target word and link action for a simple link by performing determination steps and repeating the determination steps until each source word has an associated simple link, where the determining steps include:

i. finding a common ancestor of a source word and the previous word, finding a left-most descendent of the common ancestor, and assigning the left-most descendent of the common ancestor as the target word of the simple link;

ii. determining if a parent of the source word is also a parent of the previous word, and if so, the link action selected is Append;

iii. determining if the parent of the source word is a child of the parent of the previous word, and if so, the link action selected is Insert Below;

iv. finding a child node of the common ancestor that is a parent or ancestor to the source word, and determining a position of the child node, which position will be numbered sequentially, and if the position of the child is 3 or greater, the link action selected is Insert Below;

v. determining if the parent of the source word is the same as the common ancestor and the parent of the target word is not the common ancestor, then the link action is Insert Above;

vi. determining if none of the previous conditions exist, the link action selected is Insert Above and Below; and (c) relaying the resulting array of simple links to further modules which perform specific computer operations.

* * * * *

UNITED STATES PATENT AND TRADEMARK OFFICE
CERTIFICATE OF CORRECTION

PATENT NO. : 9,720,903 B2  
APPLICATION NO. : 13/947878  
DATED : August 1, 2017  
INVENTOR(S) : Robert D. New et al.

Page 1 of 1

It is certified that error appears in the above-identified patent and that said Letters Patent is hereby corrected as shown below:

In the Claims

Column 22, Line 15 "... using said parser to create a language model using said..." should be -- (e) using said parser to create a language model using said --

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*